United States Patent [19]
Hagiwara et al.

[11] Patent Number: 6,045,273
[45] Date of Patent: Apr. 4, 2000

[54] AUTOMATIC DEVELOPING MACHINE FOR SILVER HALIDE PHOTOGRAPHIC LIGHT-SENSITIVE MATERIAL

[75] Inventors: Moeko Hagiwara; Yutaka Ueda, both of Hino, Japan

[73] Assignee: Konica Corporation, Japan

[21] Appl. No.: 09/015,443

[22] Filed: Jan. 29, 1998

[30] Foreign Application Priority Data

Feb. 4, 1997 [JP] Japan ..................................... 9-021395

[51] Int. Cl.[7] .............................. G03D 3/02; G03D 13/00
[52] U.S. Cl. .......................... 396/571; 396/604; 396/606; 396/626; 396/636
[58] Field of Search ................................ 396/42, 44, 604, 396/612, 620, 626, 627, 571, 636, 606; 118/266

[56] References Cited

U.S. PATENT DOCUMENTS

| | | | |
|---|---|---|---|
| 3,097,584 | 7/1963 | Wright, Jr. | 396/42 |
| 3,200,724 | 8/1965 | Stamm et al. | 396/44 |
| 5,758,223 | 5/1998 | Kobayashi et al. | 396/604 |

FOREIGN PATENT DOCUMENTS 1038570  4/1965  United Kingdom.

*Primary Examiner*—D. Rutledge
*Attorney, Agent, or Firm*—Jordan B. Bierman; Bierman, Muserlian and Lucas

[57] ABSTRACT

An apparatus for processing a silver halide photographic light-sensitive material, the apparatus having plural processes of at least a developing process, a bleaching process and a fixing process, comprises a supplying device to supply a processing solution to a silver halide photographic light-sensitive material in at least one process of the plural processes, whereby a point of the silver halide photographic light-sensitive material is supplied with the processing solution during a supplying time, wherein the point of the silver halide photographic light-sensitive material is processed during a processing time in the process and the supplying time is not longer than 70% of the processing time; and a heater to heat the silver halide photographic light-sensitive material in such a manner that a surface temperature of the silver halide photographic light-sensitive material when the silver halide photographic light-sensitive material is supplied with the processing solution by the supplying device is 40° C. to 90° C.

13 Claims, 8 Drawing Sheets

AUTOMATIC DEVELOPING MACHINE FOR SILVER HALIDE PHOTOGRAPHIC LIGHT-SENSITIVE MATERIAL

BACKGROUND OF THE INVENTION

The present invention relates to an automatic developing machine for silver halide photographic light-sensitive material (hereinafter, referred to as a developing machine) which processes a silver halide photographic light-sensitive material (hereinafter, it may be referred to as "a light-sensitive material").

In conventional photographic processing, after rolls of film were received at the reception of a photographic-specializing shop, undeveloped films or color negative films are collected and sent to a photo-finishing laboratory, called "lab", where each rolls of film is subjected to photographic processing.

Recently, however, following downsizing of automatic developing machines, so-called mini-labs, completed by means of a downsized automatic developing machine at the reception of the photographic-specializing shop, has been increasing. Recently, aforesaid mini-labs have come to be proliferated in drug stores, etc. other than the photographic-specializing shop. Further, tendency of dispersion of labs and downsizing have also accelerated.

Aforesaid developing machine is composed of color developing, bleaching, bleach-fixing, fixing, stabilizing and washing steps, in which a light-sensitive material is processed by means of respective processing liquid. In aforesaid automatic developing machine, replenishment of a new processing liquid is conducted dependent upon the amount of processed light-sensitive material.

Under aforesaid dispersion conditions, the amount of light-sensitive material processed per day in one automatic developing machine tends to be lessened. Since the automatic developing machine renews a processing liquid depending upon the amount of light-sensitive material processed, as the amount of light-sensitive material processed is reduced, the renewal rate of the processing liquid is reduced and the processing liquid remains in the processing tank in an automatic developing machine for a long time. Accordingly, the processing liquid is condensed and deteriorated. If the processing liquid is deteriorated, sufficient processing ability is lost. For example, the maximum density of the light-sensitive material after photographic processing is deteriorated. In addition, the change of the degree of the developing liquid due to deterioration is not always the same, it is difficult to obtain constant quality of developability.

In addition, tar which occurs due to the deterioration of the processing liquid, contamination on the automatic developing machine due to the coagulation by condensation of the processing liquid after being processed and the occurrence of mildews and bacteria tend to occur.

Specifically, recently, in order to reduce load on environment, the technologies have been developed in the direction of low liquid-discarding and low replenishing. Accordingly, the above-mentioned problems has further been serious.

As a technology to enhance renewal rate of the processing liquid without increasing the amount of effluent and replenisher, it is considered to reduce the capacity of the processing liquid tank. However, if the volume of the processing liquid is reduced in order to enhance renewal rate of the processing liquid, conveyance path is shortened. Ordinarily, in a processing step time, in which one processing step is included, it is considered that it is preferable to dip a light-sensitive material in the processing liquid as long as possible from both viewpoints of rapid processing property and processing stability. Accordingly, in order not to reduce dipping time in a shortened conveyance path, conveyance speed must be slowed. However, this reduced processing ability of the automatic developing machine is reduced.

In order to solve the above-mentioned problem, a technology to cause the processing liquid tank slit-shaped for the reduction of the liquid amount of the processing liquid tank is disclosed in Japanese Patent Publication Open to Public Inspection (hereinafter, referred to Japanese Tokkaisho) No. 2-129635.

However, even due to this method, there is a limit to reduction of the amount of processing liquid in the processing liquid tank. Therefore, deterioration of the processing liquid due to reduction of the above-mentioned renewal rate cannot completely be overcome.

SUMMARY OF THE INVENTION

The present invention was attained viewing the above-mentioned conditions.

A first object of the present invention is to provide an automatic developing machine which can constantly and stably process a light-sensitive material while the processing liquid is not deteriorated even when the amount of light-sensitive material being processed is low.

A second object of the present invention is to provide an automatic developing machine which does not produce tar or coagulation even when the amount of light-sensitive material processed is low and the replenishment amount of the processing liquid is low and which is excellent in terms of maintenance property.

A third object of the present invention is to provide an automatic developing machine which attains low effluent amount and which realizes reduction of environmental load.

A fourth object of the present invention is to provide an automatic processing machine excellent in rapid processing property wherein rapid processing property can be maintained.

Objects described other than those described above will be revealed by during the following description.

Objects of the present invention will be attained by each of the following items.

Item 1

"An automatic developing machine for silver halide photographic light-sensitive material having a processing liquid feeding means which feeds a processing liquid to a silver halide photographic light-sensitive material, wherein processing liquid feeding time in which the above-mentioned processing liquid is fed onto the above-mentioned silver halide photographic light-sensitive material by means of the above-mentioned processing liquid feeding means in at least one processing step occupies 70% or less of the step time of the relevant processing step and a heating means which heats the above-mentioned silver halide photographic light-sensitive materialize such a manner that the surface temperature of the above-mentioned silver halide photographic light-sensitive material when the above-mentioned processing liquid is fed onto the above-mentioned silver halide photographic light-sensitive material by the above-mentioned processing liquid feeding means is 40° C. or more and 90° C. or less."

Ordinarily, in a processing step time in which one processing step is included, it is considered that it is preferable to dip a light-sensitive material in the processing liquid from both the viewpoint of rapid processing property and processing stability.

On the other hand, in order to dip the light-sensitive material into the processing liquid as long as possible while conveyance speed is not retarded so as not to reduce processing efficiency in a processing step, it is necessary to extend the conveyance path during which the material is dipped in the processing liquid. Therefore, the capacity of the processing liquid tank is enlarged accordingly. Following this, renewal rate of the processing liquid is also reduced. As a result, deterioration of the processing liquid when the amount of processing is low becomes serious.

According to the present invention as described in this item, due to the fact that the automatic developing machine has a processing step in which the processing liquid feeding time occupies 70% or less of the processing time of this processing step, the amount of processing liquid is reduced without reducing processing efficiency, renewal rate of the processing liquid is improved, deterioration of the processing liquid is minimized and thereby processing stability can be obtained.

According to the present invention as described in this item, the temperature of the light-sensitive material when the processing liquid is fed onto the light-sensitive material is enhanced to a range of 40° C. or more and 90° C. or less. Therefore, due to the fact that the amount of processing liquid is reduced, it is possible to maintain rapidity and processing stability without reducing processing efficiency, though the processing liquid feeding time which is the time for feeding the processing liquid onto the light-sensitive material is reduced.

According to the present invention as described in this item, in processing the light-sensitive material, it is possible to improve renewal rate of the processing liquid and minimize the deterioration of the processing liquid while maintaining rapidity of processing and processing stability.

In addition, it is possible to reduce the capacity of the processing liquid tank and it is also possible to downsize the overall automatic developing machine.

Item 2

"The automatic developing machine for silver halide light-sensitive material described in item 1, wherein the above-mentioned processing liquid feeding time of aforesaid processing step occupies 30% or less of the processing step time of aforesaid processing step."

According to the present invention as described in the present item, in processing the light-sensitive material, it is possible to further improve renewal rate of the processing liquid and minimize the deterioration of the processing liquid while maintaining rapidity of processing and processing stability.

Item 3

"The automatic developing machine for silver halide light-sensitive material described in item 1 or 2, wherein aforesaid processing step is a color developing step or a photographic processing step."

Processing stability is specifically important in the color developing step and the photographic processing step. In the color developing step and the photographic processing step, deterioration of processing liquid is the most serious.

According to the present invention as described in the present item, in processing the light-sensitive material in the photographic processing step having the above-mentioned features, it is possible to improve renewal rate of the processing liquid and minimize the deterioration of the processing liquid while maintaining rapidity of processing and processing stability.

Item 4

"The automatic developing machine for silver halide photographic light-sensitive material described in any of item 1 through 3, wherein at least one of aforesaid processing step is a processing step which feed at least 2 kinds of processing liquid to the above-mentioned silver halide photographic light-sensitive material."

According to the invention as described in the present item, it becomes possible to use the processing liquid having strong chemical reactivity. Therefore, it is possible to improve rapidity. In addition, since liquids having strong chemical reactivity can be stored separately, storage stability is also improved. Therefore, processing stability is also improved.

Item 5

"The automatic developing machine for silver halide photographic light-sensitive material described in item 4, wherein at least 2 kinds of the above-mentioned processing liquid are respectively a processing liquid having a color developing agent and a processing liquid having an alkaline agent."

The processing liquid having a color developing agent has better storage stability under acid atmosphere, on the other hand, has better chemical reactivity under an alkaline atmosphere. In addition, it is preferable that a color developing step is conducted under alkaline atmosphere.

Due to the invention as described in the present item, the color developing step can be conducted under alkaline atmosphere and rapidity can be improved. Further, the processing liquid having a color developing agent can be stored under an acidic atmosphere. Therefore, storage stability is improved, and processing stability is also improved.

Item 6

"The automatic developing machine for silver halide photographic light-sensitive material described in item any of 1 through 5, wherein the amount of processing liquid fed onto the above-mentioned silver halide photographic light-sensitive material by the above-mentioned processing liquid feeding means within the above-mentioned processing liquid feeding time is 5 ml or more and 100 ml or less per 1 $m^2$ of the above-mentioned silver halide photographic light-sensitive material."

Due to the invention as described in the present item, an appropriate amount of processing liquid is fed onto the light-sensitive material. Therefore, processing stability can be obtained, and the amount of processing liquid used can be reduced.

Item 7

"The automatic developing machine for silver halide photographic light-sensitive material described in any of items 1 through 6, wherein the above-mentioned processing step time is 20 seconds or less."

Due to the invention described in the present item, rapidity is not reduced, and thereby it is possible to minimize reduction of processing efficiency.

Item 8

"The automatic developing machine for silver halide photographic light-sensitive material described in any of items 1 through 7, wherein the conveyance speed of the above-mentioned silver halide photographic light-sensitive material in aforesaid processing step is 5 mm/second or more and 500 mm/second or less."

Due to the invention described in the present item, rapidity is not reduced, and thereby it is possible to minimize reduction of processing efficiency.

Item 9

"The automatic developing machine for silver halide photographic light-sensitive material described in any of items 1 through 8, wherein the above-mentioned processing liquid is fed onto the above-mentioned silver halide photographic light-sensitive material by dipping the above-mentioned silver halide photographic light-sensitive material in the above-mentioned processing liquid in a processing liquid tank by the above-mentioned processing liquid feeding means."

Due to the invention as described in the present item, it is possible to conduct stable processing in which there is no development unevenness.

Item 10

"The automatic developing machine for silver halide photographic light-sensitive material described in item 9, wherein the time at which a certain point of the above-mentioned silver halide photographic light-sensitive material is dipped in the above-mentioned processing liquid in the above-mentioned processing liquid tank."

Due to the invention described in the present item, rapidity is not reduced, and thereby it is possible to minimize reduction of processing efficiency.

Item 11

"The automatic developing machine for silver halide photographic light-sensitive material described in any of items 1 through 10, wherein the above-mentioned processing liquid is caused to retain in a processing liquid feeding medium by letting the above-mentioned processing liquid in a processing tank to contact the above-mentioned by the above-mentioned processing liquid feeding means.

Due to the invention as described in the present item, the amount processing liquid retained in a developing tank is relatively small. Therefore, deterioration of the processing liquid can further be minimized, and stable processing can be conducted.

Item 12

"The automatic developing machine for silver halide photographic light-sensitive material described in item 11, wherein the above-mentioned processing liquid feeding roller is a processing liquid feeding rollers which feed the processing liquid onto the above-mentioned silver halide photographic light-sensitive material while rotating."

Due to the invention as described in the present item, the saved amount processing liquid retained in a developing tank is small. Therefore, deterioration of the processing liquid can further be minimized, and stable processing can be conducted.

Item 13

"The automatic developing machine for silver halide photographic light-sensitive material described in item either 9 through 12, wherein, provided that the length of the above-mentioned silver halide photographic light-sensitive material in approximately perpendicular to the conveyance direction of the above-mentioned silver halide photographic light-sensitive material is defined to be D (cm) and the conveyance speed of the above-mentioned silver halide photographic light-sensitive material in aforesaid is defined to be R (cm/sec.), the liquid amount of the above-mentioned processing liquid in the above-mentioned processing liquid tank is $0.3 \times D \times R$ (ml) or more and $50 \times D \times R$ (ml) or less."

Due to the invention as described in the present item, the amount of processing liquid kept in the processing liquid tank is set to be appropriate. Therefore, by preventing to keep excessive processing liquid while processing liquid amount sufficient for processing is being fed, renewal rate of the processing liquid can be improved and thereby deterioration of the processing liquid can further be prevented and stable processing can be conducted.

Item 14

"The automatic developing machine for silver halide photographic light-sensitive material described in any of items 9 through 13, wherein, provided that the length of the above-mentioned silver halide photographic light-sensitive materialize approximately perpendicular to the conveyance direction of the above-mentioned silver halide photographic light-sensitive material is defined to be D (cm) and the conveyance speed of the above-mentioned silver halide photographic light-sensitive material in aforesaid is defined to be R (cm/sec.), the volume of the above-mentioned processing liquid tank is $0.3 \times D \times R$ (ml) or more and $50 \times D \times R$ (ml)."

Due to the invention as described in the present item, the dimensions of the processing liquid tank can be downsized so that downsizing of the automatic developing machine can be contrived.

Explanation of Terminology

"An automatic developing machine for silver halide photographic light-sensitive material" or "an automatic developing machine" referred in the present invention represents a machine which processes the above-mentioned silver halide photographic light-sensitive material by feeding a processing liquid to a silver halide photographic light-sensitive material. It may be integral with an exposure device or a printer & processor type, or it may be a processor composed only of a developing device.

"Processing step time" in the present invention represents the time since the leading end of the light-sensitive material contacts the processing liquid used in the relevant processing step until the end of aforesaid light-sensitive material contacts a processing liquid used in the next processing step. The processing steps include a photographic processing step, a color developing step, a bleaching step, a fixing step, a bleach-fixing step, a stabilizing step and a washing step.

"Processing liquid feeding time" in the present invention represents the time in which a processing liquid in the relevant processing step is fed onto a point in the surface of the emulsion surface of a light-sensitive material. For example, when a processing liquid feeding means is a dip type, "processing liquid feeding time" represents a dipping time (since the leading end of the light-sensitive material is dipped in the liquid until the leading end of the light-sensitive material comes out of the liquid) at a certain point of the light-sensitive material. On the other hand, when the processing liquid feeding means is a medium contact type, "processing liquid feeding time" represents a contact time with rollers or a sponge at a certain point of the light-sensitive material. When the processing liquid feeding means is a non-contact type, "processing liquid feeding time" represents a spray time by a spray or a shower at a certain point of the light-sensitive material.

DETAILED DESCRIPTION OF THE PREFERRED EMBODIMENT

Figure 1:
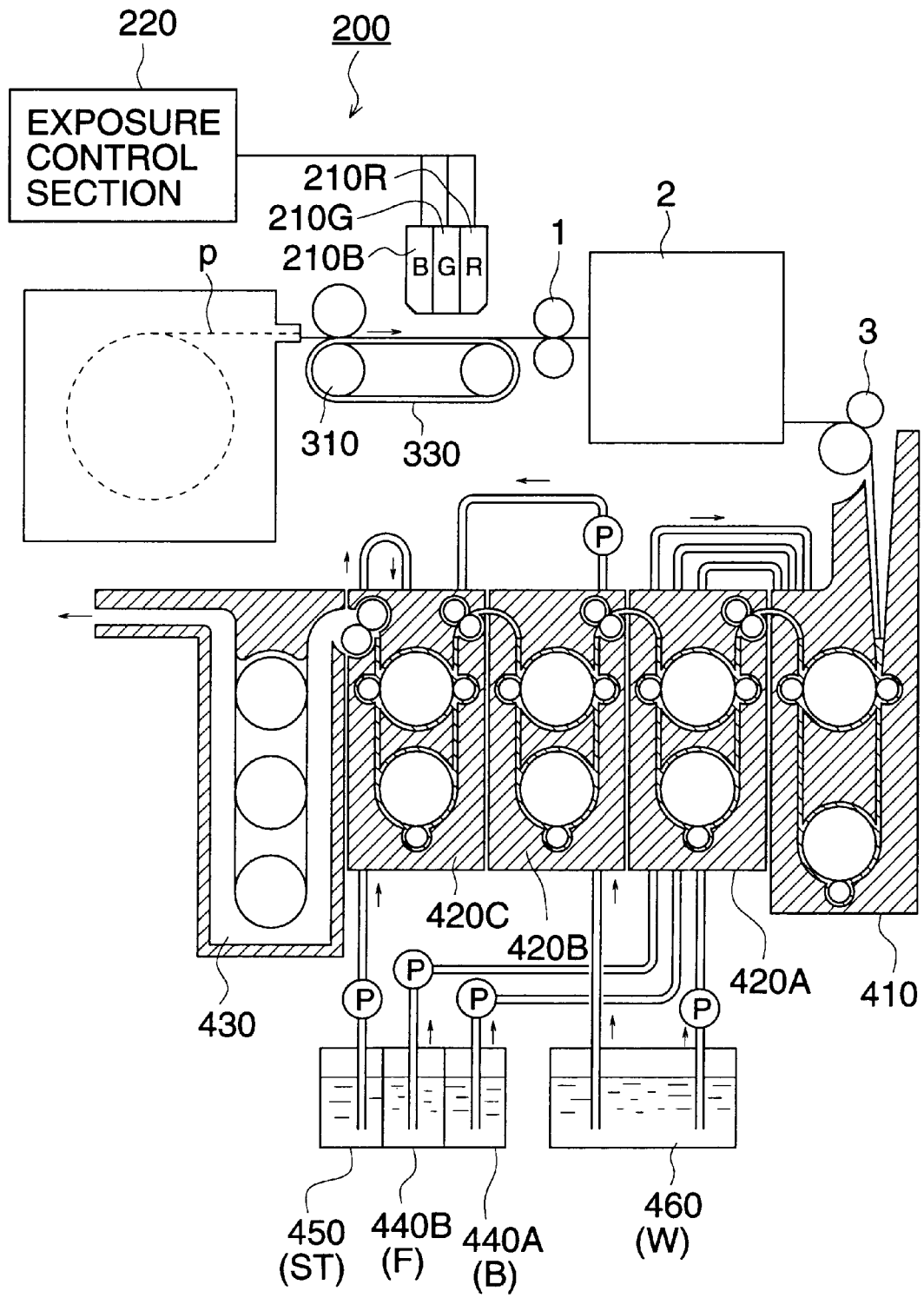
FIG. 1 shows an overall schematic drawing of an automatic developing machine for silver halide photographic light-sensitive material of the present invention.

Hereinafter, the present invention will be detailed.

First, common items of the present invention will be explained, and then, respective embodiments will be explained.

As a feeding means of a processing liquid onto a light-sensitive material, the first embodiment is a dipping type in which a light-sensitive material is dipped into a processing liquid in a processing tank, the second embodiment is a medium contact type in which liquid is fed by contacting a light-sensitive material onto a liquid feeding medium which retains processing liquid such as processing liquid feeding rollers, sponge and felt. The third embodiment is to a non-contact type which feeds processing liquid onto a light-sensitive material through a gas phase by means of a spray type, a shower type, an ink jet type and a curtain coating type. The fourth embodiment is a contact type in which liquid is fed utilizing the surface tension of liquid fed and liquid is contacted only on the emulsion surface of the light-sensitive material. In all cases, the effects of the present invention can be provided. Preferably, processing liquid is fed by a dip type or a medium contact type.

The ratio of processing liquid feeding time on the processing step time is 70% or less.

The effects of the present invention can further be effectively exhibited in the case of rapid processing. Time per one processing step is preferably 20 seconds or less, more preferably 15 seconds or less and specifically preferably 10 seconds or less.

From the viewpoint of rapidity, the processing liquid feeding time is preferably 5 seconds or less, more preferably 3 seconds or less and specifically preferably 2 seconds or less. Specifically, effects are marvelous when the processing liquid feeding means is the dip type or the medium contact type by means of processing liquid feeding rollers.

In order not to reduce processing efficiency, conveyance speed is preferably 5 mm/second or more, and more preferably 10 mm/second. In addition, from the viewpoint of processing stability, conveyance speed is preferably 500 mm/sec. or less, more preferably 200 mm/sec. or less and specifically more preferably 100 mm/sec. or less.

The surface temperature of the light-sensitive material when a processing liquid is fed onto the light-sensitive material, namely, when the light-sensitive material contacts the processing liquid at the initial stage of the processing step is 50° C. or more and 80° C. or less. It is also preferable to heat a light-sensitive material before contacting it onto the processing liquid.

From the viewpoint of minimizing deterioration of the processing liquid, the amount of processing liquid tank in the case of the dip type and the amount of processing liquid tank in the case of a medium contact type using a processing liquid feeding roller in which the processing liquid is fed by contacting the processing liquid feeding rollers, which is brought into contact with the above-mentioned processing liquid in the processing liquid tank, onto the light-sensitive material are preferably 50×D×R (ml) or less and more preferably 10×D×R (ml) and specifically more preferably 5×D×R (ml), provided that the width of the light-sensitive material (the dimension of the light-sensitive material which is perpendicular to the conveyance direction) is defined to be D (cm) and the conveyance speed of the light-sensitive material in the relevant processing step is defined to be R (cm/sec.). From the viewpoint of processing stability, the amount of processing liquid is preferably 0.3×D×R (ml) or more and more preferably 0.5×D×R (ml) or more. From the viewpoint of downsizing of the apparatus, it is preferable to set the volume of the processing liquid tank in the above-mentioned range, not only the amount of the liquid of the processing liquid.

A heating means which heats a light-sensitive material includes a transmission heating means which heat the light-sensitive material due to transmission by contacting the heating medium such as a heat rollers, a heat drum or a heat belt, a connective heating means which heats the light-sensitive material due to the convection by means of a drier and a radiation heating means which heats due to radiation of an infrared wave or a high frequency electromagnetic wave.

It is preferable, since unnecessary heating can be presented, to have a heating controlling means which controls in such a manner that, only when a light-sensitive material exists at a point where a heating means heats, the above-mentioned heating means provides heating. Aforesaid mechanism can be attained by an apparatus having a conveyance means which conveys the light-sensitive material at a prescribed conveyance speed and a light-sensitive material sensing means which senses the existence of the above-mentioned light-sensitive material located on a prescribed position on upstream side in terms of the conveyance direction of the above-mentioned conveyance means, wherein the above-mentioned heating and controlling means conducts controlling based on sensing by means of the above-mentioned light-sensitive material sensing means. In aforesaid occasion, it is preferable to control to provide a prescribed heating by the above-mentioned heating means since the above-mentioned light-sensitive material sensing means senses the existence of the light-sensitive material at the above-mentioned prescribed position until a prescribed time passes after sensing the absence of the light-sensitive material.

It is preferable to have a means which minimizes the reduction of the light-sensitive material after feeding the processing liquid.

In order to keep the temperature of the light-sensitive material as high as possible, it is preferable that the amount of liquid which is brought into contact with the light-sensitive material is as small as possible. Specifically, it is preferable to feed the processing liquid only to be used for the emulsion surface of the light-sensitive material. Accordingly, with regard to a processing liquid feeding means, the medium contact type is better than the dip type.

When the present invention is applied to a color developing step or a photographic processing step, from the viewpoint of obtaining uniform wettability and uniformly feeding the processing liquid, the surface tension of the developing liquid is preferably 15 dyne/cm or more and 45 dyne/cm or less, and more preferably 20 dyne/cm or more and 35 dyne/cm or less. In order to regulate surface tension, it is preferable to incorporate fluorine-containing active agents disclosed in Japan Tokkaihei 7-92634 or ethylene oxide-containing or glycidol-containing nonion type or silicone-containing active agents.

From the viewpoint of obtaining the objects of the present invention, the amount of developing liquid fed from respective feeding means onto an emulsion surface of a silver halide photographic light-sensitive material is preferably 5 ml or more and more preferably 10 ml or more per $m^2$ of light-sensitive material. In addition, it is preferably 100 ml or less, more preferably 60 ml or less and specifically preferably 30 ml or less per $m^2$.

In the present invention, from the viewpoint of processing at high pH, it is preferable to separate a developing liquid into a liquid containing a color developing agent or a developing agent and a liquid containing alkaline, and feed separately.

When two kinds of liquids are used as developing liquids, a developing starter is a processing liquid containing a color developing agent or a developing agent which is an aqueous solution containing a surfactant, a solubilization agent of a color developing agent and a preserver. A developing proceeding liquid is a processing liquid, in which alkaline is the main component, which is an aqueous solution containing a surfactant, a solubilization agent of a color developing agent, a preserver and a chelating agent.

pH value of the developing starter is 7 or less, and pH value of the developing proceeding liquid is 8 or more. Preferably, pH value of the developing starter is 4 or less, and pH value of the developing proceeding liquid is 10 or more.

A color developing agent used for the developing starter is preferably a para-phenylenediamine-containing compound. As a para-phenylenediamine-containing compound, compounds having a water-solubilizing group are preferable. As a para-phenylenediamine-containing compound having a water-solubilizing group, a para-phenylenediamine-containing compound having a water-solubilizing group at an amino group or on a benzene nuclei. As practical illustrated compounds of a para-phenylenediamine-containing compound preferably used in the present invention, (C-1) through (C-16) described in Japan Tokkaihei, on pp. 7 through 9 and (1) through (26) described in Japan Tokkaihei, pp. 6 through 10. The above-mentioned color developing agents are ordinarily used in a form of hydrochlorate, sulfate and p-toluene sulfonic acid salt.

As a solubilizing agent of a color developing agent, triethanolamine, polyethylene glycols and paratoluene sulfonic acid described in Japanese Patent Application No. 10769/1995 are cited. Added amount thereof is 1 g or more and 100 g or less, preferably 5 g or more and 80 g or less and more preferably 10 g or more and 50 g or less per 1 liter. As a preserver, sodium sulfite and hydroxylic amines described in Japan Tokkaihei 8-29924 are cited.

Developing agents used in a developing starter are preferably phenydone, 4-hydroxymethyl-4-methyl-l-phenyl-3-pyrazolidone, Methol, ascorbic acid and hydroquinone.

pH value of the alkaline agent used for a developing proceeding liquid is 8.0 or more when 7.0 g thereof is dissolved in 1 liter of pure water. As practical examples of aforesaid alkaline agent, sodium carbonate, potassium carbonate, sodium bicarbonate, potassium bicarbonate, tri-sodium phosphate, tripotassium phosphate, disodium phosphate, dipotassium phosphate, sodium borate, potassium borate, sodium tetraborate (borax), potassium tetraborate, sodium hydroxide, potassium hydroxide and lithium hydroxide are cited. Of these, sodium carbonate, potassium carbonate, sodium bicarbonate and potassium bicarbonate are preferable.

In the case of double-liquid processing in which two kinds of liquid, i.e., a liquid containing a color developing agent and a liquid containing alkaline, are fed for processing, the amount fed of respective liquid is preferably 2 ml or more and more preferably 5 ml or more per $m^2$ of a light-sensitive material. It is also preferably 90 ml or less, more preferably 40 ml or less and specifically more preferably 30 ml or less.

Time in which the developing proceeding liquid is fed is, from the viewpoint of obtaining effects which are the objects of the present invention, preferably 5 seconds or less after feeding the developing starter and more preferably 0.1 second or more and 2 second or less.

In order to enable reduction of the amount of effluent, the amount of feeding a color photographic processing liquid onto a silver halide photographic light-sensitive material is preferably proportional to the amount of exposure onto a light-sensitive material.

From the viewpoint of rapidity and stability of processing, the processing liquid is preferably dense. In the present invention, liquid renewal rate is extremely high. Specifically, when the processing liquid feeding means is a medium contact type or a non-contact type, only necessary amount of the processing liquid is fed onto the emulsion surface of the light-sensitive material. Therefore, even if a dense liquid is used, crystal coagulation and contamination, due to deterioration of a color developing agent, becoming tar and evaporation, become scarcely problematic.

Practically, in the case of a developing liquid, the added amount of a color developing agent is 10 g or more and 20 g or more per 1 liter, from the viewpoint of obtaining effects of the objects of the present invention.

The kind of light-sensitive material in which the present invention is applied includes a color negative film, a color reversal film, a color paper, an X-ray film, a graphic art film, and a direct positive film. Of these, the present invention can provide more noticeable effects when being applied to color paper and X-ray film. The most preferable is color paper.

A light-sensitive material may either be a web type, a web type after being cut to a prescribed size or a sheet type. It is preferable to use a web type after being cut to a prescribed size or a sheet type, since loss of a light-sensitive material is small when a problem occurs. Specifically, when a web type color paper is used after being cut to a prescribed size, it is preferable to subject the color paper to exposure and photographic processing after cutting the color paper before exposure.

Light-sensitive materials applicable to the present invention include light-sensitive materials containing a silver chloride emulsion and a light-sensitive material containing a silver bromide emulsion.

Next, examples of the embodiments of the present invention and examples are exhibited as below. However, the present invention is not limited thereto. In addition, the embodiments of the present invention and examples shows preferable examples. However, they do not limit the meaning of terminology or technological scope of the present invention.

Embodiment 1

FIG. 1 is an overall schematic drawing of an automatic developing machine which conducts exposure and photographic processing of color paper in which the present invention is applied to a color developing section.

Referring to FIG. 1, aforesaid automatic developing machine is explained.

First, QA-A6 color paper p (a web type color paper) produced by Konica was subjected to decomposition wedge exposure to B, G and R by means of a conventional method, and then subjected to processing using chemical produced by Konica (chemical for process CPK-2-20). From the above-mentioned results, relationship (characteristics curve) between B, G and R exposure amount and Y, M and C coloring density. Next, a sample image provided ordinarily with gray wedge in which the above-mentioned color paper p was processed with CPK-2-20 process. Aforesaid image was converted to analytic density by means of an image processing apparatus (not illustrated). Aforesaid analytic density was converted to the exposure amount of color paper p. By the use of exposure device 200, exposure is given to aforesaid color paper p. When color paper p, a light-sensitive material, is conveyed to an arrowed direction, the exposure of red light-source printing head 210R having an LED array, green light source printing head 210G having a vacuum fluorescent tube array and blue light-source printing head 210B is controlled by exposure control section 220 depending upon exposure amount data of an image from an image processing apparatus, and exposure each color at a prescribed position of color paper p.

On the downstream side of paper conveyance in aforesaid exposure device 200, color photographic processing section 2 is provided. Aforesaid color photographic processing section 2 will be later. On the downstream of exposure device 200 and color photographic processing section 2, bleach-fixing tank 410, first stabilizing tank 420A, second stabilizing tank 420B, a processing liquid tank composed of third stabilizing tank 420C and drying section 430 are provided.

After color paper p was exposed in exposure device 200, it was subjected to color photographic processing in color photographic processing section 2, and then it was subjected to bleach-fixing in bleach-fixing tank 410, followed by stabilizing in first stabilizing tank 420A, second stabilizing tank 420B and third stabilizing tank 420C. Finally, aforesaid color paper p was subjected to drying in drying section 430 so that a photographic print is made.

By means of a replenishment cartridge and replenisher 440A, bleaching replenishing liquid (B) is replenished to bleach-fixing tank 410. By means of a replenishment cartridge and replenisher 440B, fixing replenishing liquid (F) is replenished to bleach-fixing tank 410. By means of a replenishment cartridge and replenisher 450, stabilizing replenishing agent is replenished to third stabilizing tank 420C.

Figure 2:
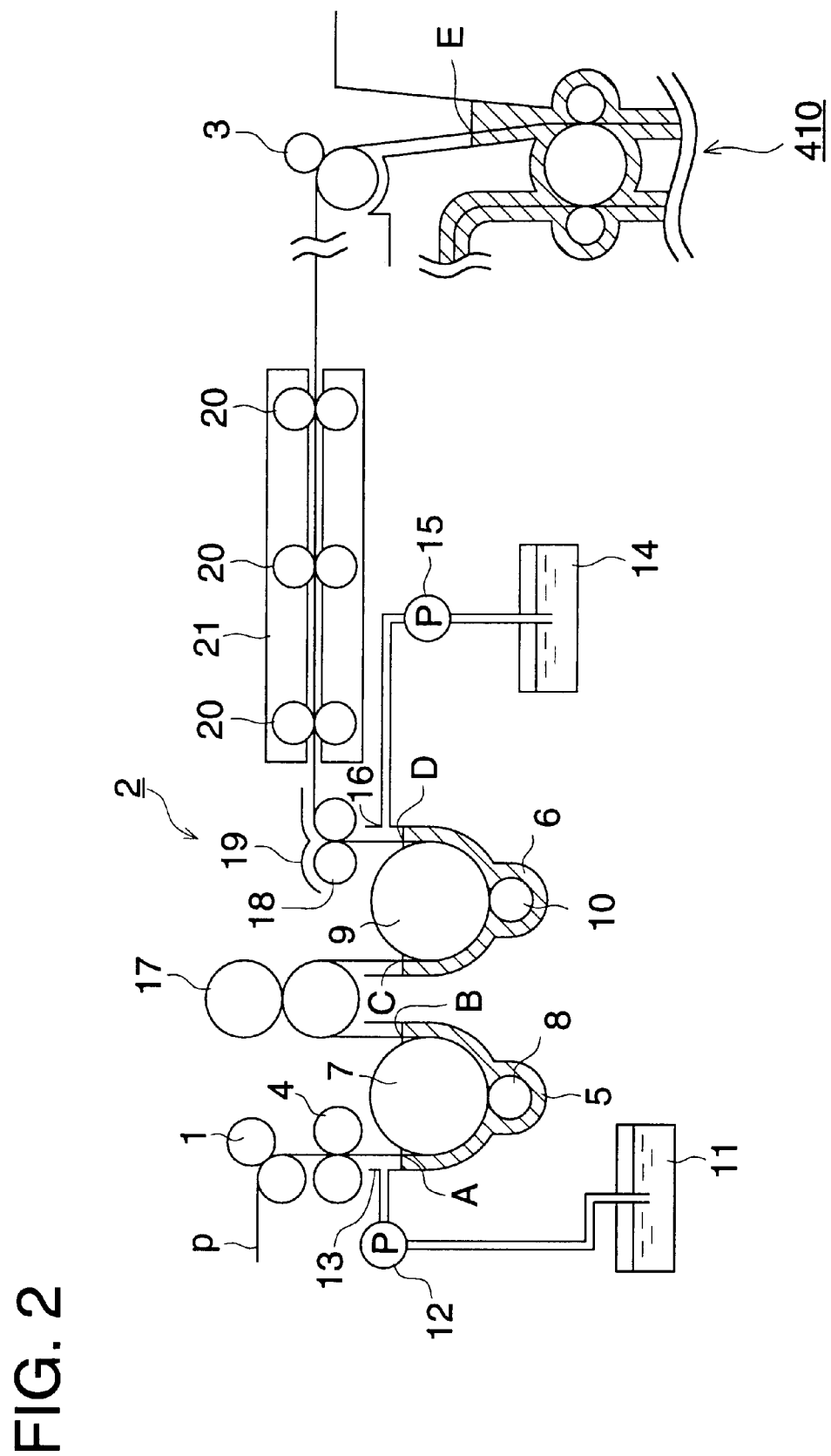
FIG. 2 is a schematic block drawing showing one example of an embodiment of a color developing section of an automatic developing machine for silver halide photographic light-sensitive of the present invention.

FIG. 2 is a schematic view showing one example of an embodiment of color photographic processing section 2 which conducts a color photographic processing step of the present invention.

Color paper p is fed to color photographic processing section 2 from exposure device 200 through conveyance rollers 1, and then is pressed on heating roller 4 which is a heating means. Color paper p is conveyed while being heated by heating roller 4 in such a manner that the surface temperature becomes 50° C. or more and 80° C. or less. Next, the color paper p is fed to developing starter tank 5.

In developing starter 5, as a developing starter, a processing liquid containing a color developing agent is contained. After being fed by conveyance rollers 7 and 8, color paper p is dipped in the developing starter in developing starter tank 5, and then, fed to developing proceeding tank 6 from developing starter tank 5 through conveyance rollers 17.

The developing starter is supplied to developing starter tank 5 by feeding a developing starter replenishing liquid stored in cartridge 11 for developing starter replenishing liquid onto the replenishing port 13 of developing starter tank 5 by means of pump 12.

In developing proceeding tank 6, as a developing proceeding liquid, a processing liquid containing an alkaline agent is contained. After being fed by conveyance rollers 9 and 10, color paper p is dipped in the developing starter in developing proceeding tank 5, and then, fed to guide 19 through conveyance roller 17 and then fed to heating plate 21 from developing proceeding tank 6.

The developing proceeding liquid is supplied to developing proceeding tank 5 by feeding a developing proceeding replenishing liquid stored in cartridge 14 for developing proceeding replenishing liquid onto the replenishing port 16 of developing proceeding tank 6 by means of pump 15.

Color paper p fed from developing proceeding tank 6 through conveyance rollers 18 is conveyed between heat plates 21 by means of conveyance rollers 20. Heat plates are two sheets of plates which sandwiches color paper p from above and below. By heating aforesaid plates or increasing the plates itself, color paper p is heated while being conveyed. On the surface of color paper p sent to heat plates 21, the developing starter and the developing proceeding liquid in which color paper p is dipped in developing starter tank 5 and developing proceeding tank 6 still remain. Therefore, color photographic processing is continuously conducted even during color paper p is conveyed between heat plates 21 by means of conveyance rollers 20.

Color paper p is preferably heated to 50–80° C. by means of heat plates 21, from the viewpoint of processing rapidity.

Color paper p which passed heat plates 21 is sent to bleach-fixing section 410 from color photographic processing section 2 through conveyance rollers 3.

In the present embodiment, developing starter tank 5 and developing proceeding tank 6 are arranged horizontally. However, arrangement of developing starter tank 5 and developing proceeding tank 6 is not limited thereto. Developing starter tank 5 and developing proceeding tank 6 may also be arranged approximately vertically.

Here, processing step time and processing liquid feeding time will be explained.

The leading end of color paper p touches the developing starter contained in developing starter tank 5 is defined to be a processing step starting point (point A). The leading end of color paper p comes out of developing proceeding tank 5 is defined to be Point B. The leading end of color paper p touches the developing proceeding liquid contained in developing proceeding tank 6 is defined to be a processing step starting point (point C). The leading end of color paper p comes out of developing proceeding tank 5 is defined to be Point D. A point where the leading end of color paper p touches the bleach-fixing liquid in bleach-fixing tank 410 wherein bleach-fixing step is conducted is defined to be processing step finishing point (point E).

"Processing step time" in a color photographic processing step of the present embodiment is defined to be time since the leading end of color paper p is conveyed from point A to point E ($T_{tot}$).

"Processing liquid feeding time" in the color photographic processing step of the present embodiment is defined to be the sum of the time ($T_{dev}$) between a time since the leading end of color paper p is conveyed to point B, and a time since the leading end of color paper p is conveyed from point C to point D.

$$0 < T_{dev}/T_{tot} \leq 0.7,$$

and preferably $$0 < T_{dev}/T_{tot} \leq 0.3.$$

In the present embodiment, $T_{tot}$ is 10 seconds.

Embodiment 2

Next, another example of the embodiment of an automatic developing machine of the present invention will be explained referring to FIG. 3.

Figure 3:
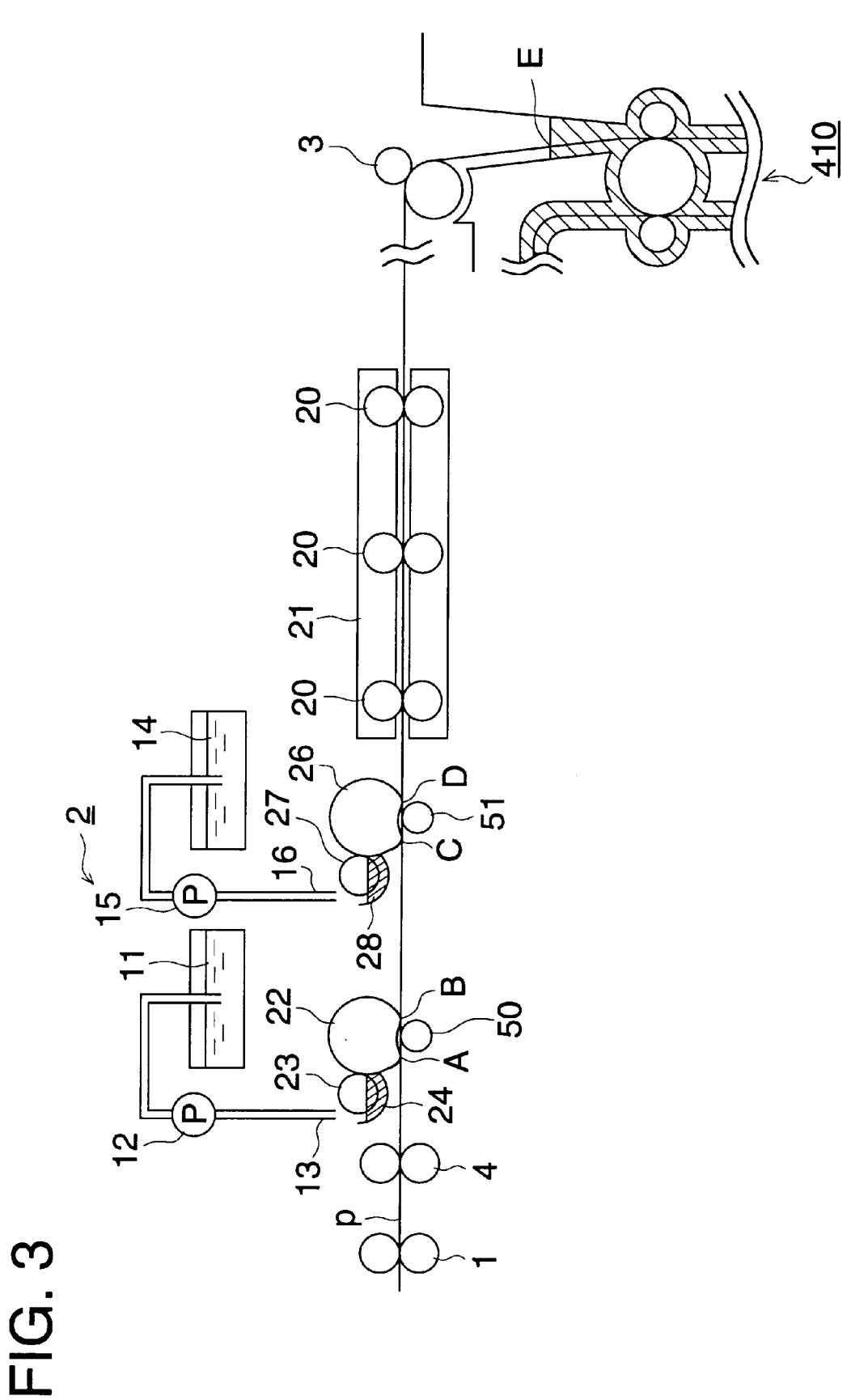
FIG. 3 is a schematic block drawing showing another example of an embodiment of a color developing section of an automatic developing machine for silver halide photographic light-sensitive of the present invention.

FIG. 3 is a schematic drawing showing another example of the embodiment of color photographic processing section 2 which conducts a color photographic processing step. Incidentally, the present embodiment employs two medium contact type sponge rollers as a processing liquid feeding means.

All portions except for color photographic processing section in the automatic developing machine is completely the same as those in Embodiment 1.

Color paper p is fed to color photographic processing section 2 from exposure device 200 through conveyance rollers 1. Color paper p is pressed onto heat rollers 4, which is a heating means. Aforesaid color paper p is conveyed while being heated at 50° C. or more and 80° C. or less, and then, conveyed to developing starter feeding rollers 22.

To developing starter feeding rollers 22, feeding rollers 23 and liquid receiver 24 which receives a developing starter are adjoined to be provided. The developing starter stored in liquid receiver 24 is fed to developing starter feeding rollers 22 through feeding roller 23. The lateral length of developing starter feeding rollers 22 has the same lateral length as or a slightly longer than that of color paper p. The developing starter fed onto developing starter feeding rollers 22 by feeding rollers 23 is retained on the surface of developing starter feeding rollers 22. The developing starter is a processing liquid containing a color developing agent.

Color paper p conveyed hereto is supplied by means of developing starter feeding rollers 22, while the developing starter is coated onto the surface of the color paper. Color paper p is conveyed to developing proceeding liquid feeding rollers 26 from developing starter feeding rollers 22 through conveyance rollers 50.

Renewal of the developing starter is conducted by feeding the developing starter replenishing liquid stored in developing starter replenishing liquid cartridge 11 to liquid reservoir 24 through replenishing port 13.

In the same manner as in developing starter feeding rollers 22, developing proceeding liquid feeding roller 26 is adjoiningly provided with feeding roller 27 and liquid reservoir section 28 wherein the developing proceeding liquid is reserved. The developing proceeding liquid stored in liquid reservoir 28 is fed to developing proceeding liquid feeding rollers through feeding roller 27. Developing proceeding liquid feeding roller 26 are also sponge rollers. The developing proceeding liquid fed to developing proceeding liquid feeding roller 26 by means of feeding roller 27 is retained to the sponge on the surface of developing proceeding liquid feeding roller 26. The developing proceeding liquid is a processing liquid containing an alkaline agent.

Color paper p conveyed hereto is supplied by means of developing starter feeding roller 22, while the developing starter is coated onto the surface of the color paper so that color photographic processing is conducted. Color paper p is conveyed from developing proceeding liquid feeding roller 26 to heat plates 21 conveyance rollers 50.

Renewal of the developing starter is conducted by feeding the developing starter replenishing liquid stored in developing starter replenishing liquid 14 to liquid reservoir 28 through replenishing port 16.

Color paper p fed from developing proceeding liquid feeding roller 26 is conveyed between heat plates 21 by means of conveyance rollers 20. Heat plates are two sheets of plates which sandwiches color paper p fromabove and below. By heating aforesaid plates or increasing the plates itself, color paper p is heated while being conveyed. On the surface of color paper p sent to heat plates 21, the developing starter and the developing proceeding liquid which were fed at developing starter feeding roller 22 and developing proceeding liquid feeding roller 26 still remain. Therefore, color photographic processing is continuously conducted even during color paper p is conveyed between heat plates 21 by means of conveyance rollers 20.

Color paper p is preferably heated to 50°–80° C. by means of heat plates 21, from the viewpoint of processing rapidity.

Color paper p which passed heat plates 21 is sent to bleach-fixing section 410 from color photographic processing section 2 through conveyance rollers 3.

Here, processing step time and processing liquid feeding time will be explained.

The leading end of color paper p touches the developing starter contained in developing starter tank 5 is defined to be a processing step starting point (Point A). The leading end of color paper p comes out of developing proceeding tank 5 is defined to be Point B. The leading end of color paper p touches the developing proceeding liquid contained in developing proceeding tank 6 is defined to be a processing step starting point (Point C). The leading end of color paper p comes out of developing proceeding tank 5 is defined to be Point D. A point where the leading end of color paper p touches the bleach-fixing liquid in bleach-fixing tank 410 wherein bleach-fixing step is conducted is defined to be processing step finishing point (point E).

"Processing step time" in a color photographic processing step of the present embodiment is defined to be time since the leading end of color paper p is conveyed from Point A to Point E ($T_{tot}$).

"Processing liquid feeding time" in the color photographic processing step of the present embodiment is defined to be the sum of the time ($T_{dev}$) between a time since the leading end of color paper p is conveyed to point B, and a time since the leading end of color paper p is conveyed from Point C to Point D.

$$0 < T_{dev}/T_{tot} \leq 0.7,$$

and preferably $$0 < T_{dev}/T_{tot} \leq 0.3.$$

In the present embodiment, $T_{tot}$ is 10 seconds.

Embodiment 3

Next, another example of the embodiment of an automatic developing machine of the present invention will be explained referring to FIG. 4.

Figure 4:
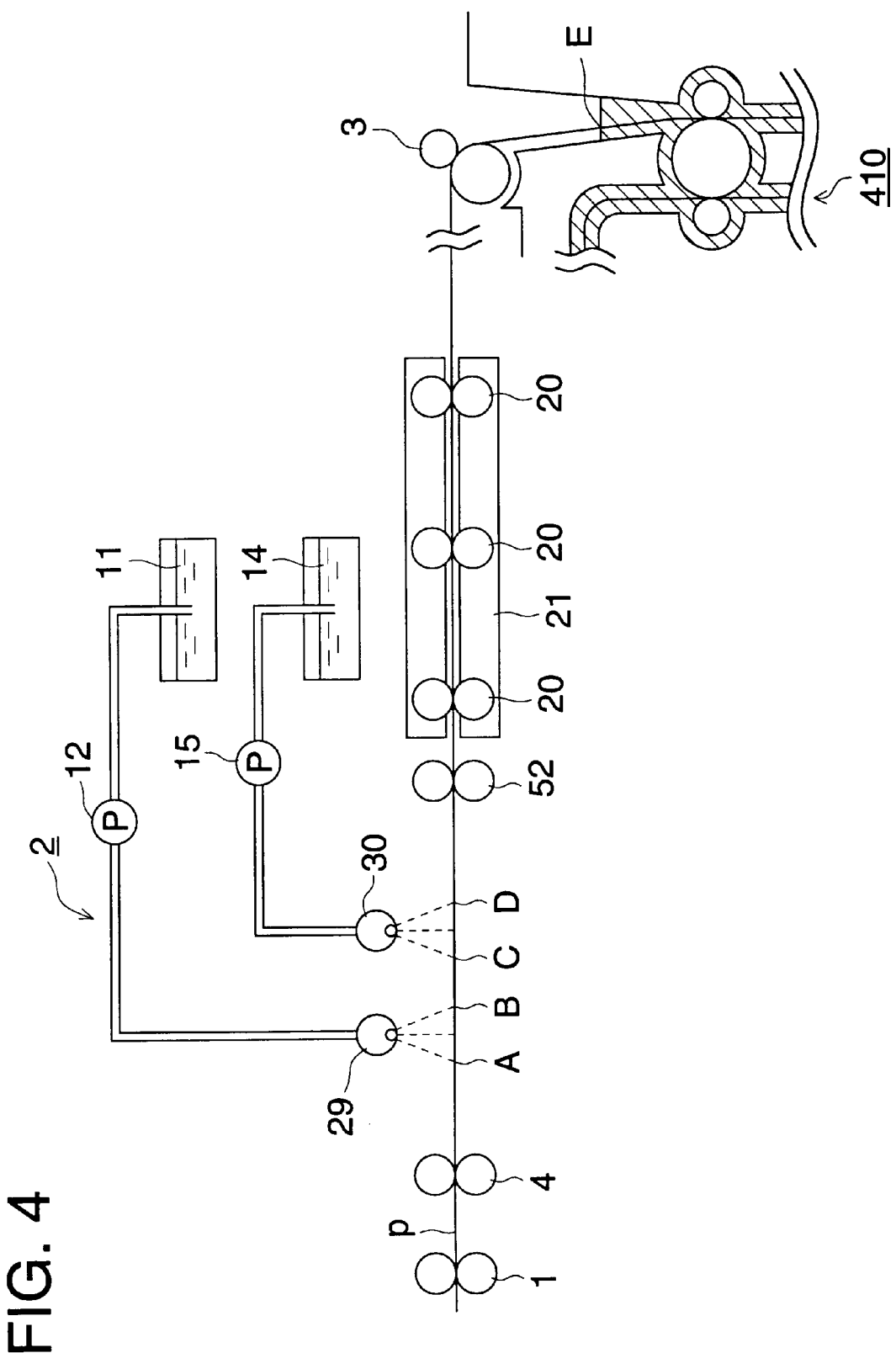
FIG. 4 is a schematic block drawing showing still another example of an embodiment of a color developing section of an automatic developing machine for silver halide photographic light-sensitive of the present invention.

FIG. 4 is a schematic drawing showing another examples of the embodiment of color photographic processing section 2 which conducts a color photographic processing step. Incidentally, the present embodiment employs two medium non-contact type shower pipe as a processing liquid feeding means.

All portions except for color photographic processing section 2 in the automatic developing machine is completely the same as those in Embodiment 1.

Color paper p is fed to color photographic processing section 2 from exposure device 200 through conveyance rollers 1. Color paper p is pressed onto heat rollers 4, which is a heating means. Aforesaid color paper p is conveyed while being heated at 50° C. or more and 80° C. or less, and then, conveyed to developing starter feeding shower pipe 29.

Developing starter feeding shower pipe 29, is provided in the lateral direction of color paper p, which is slightly longer than the width of color paper p. On aforesaid pipe, numerous holes are provided through the pipe, from which the developing starter is fed.

Developing starter is a processing liquid containing a color developing agent. To conveyed color paper p, the developing starting liquid is fed in such a manner that aforesaid developing starting liquid is splashed onto the entire surface of lateral direction of color paper p by developing starter feeding shower pipe 29 while being conveyed. After the developing starter was fed, color paper p is conveyed to developing proceeding liquid feeding shower pipe 30 from developing starter feeding shower pipe 29.

The developing starter is replenished by feeding the developing starter replenishing liquid stored in developing starter replenishing liquid cartridge 11 to developing starter feeding shower pipe 29 by means of pump 12.

Developing proceeding liquid feeding shower pipe 30 has identical structure as developing starting liquid feeding shower pipe 29, in which the developing proceeding liquid is fed to color paper p.

The developing proceeding liquid is a processing liquid containing an alkaline agent. To conveyed color paper p, the developing proceeding liquid is fed by developing proceeding liquid feeding shower in such a manner that aforesaid developing proceeding liquid is splashed onto the entire surface of lateral direction of color paper p for color photographic processing. After the developing proceeding liquid was fed, color paper p is conveyed from developing proceeding liquid feeding shower pipe 30 to heat plates through conveyance rollers 52.

With regard to the replenishment of the developing proceeding liquid, the developing proceeding replenishing liquid stored in developing proceeding replenishing liquid cartridge 14 is fed to developing proceeding liquid feeding shower pipe 30 by pump 15.

Color paper p conveyed from developing proceeding liquid feeding shower pipe 30 is conveyed between heat plates by means of conveyance rollers 20. Heat plates are two sheets of plates which sandwiches color paper p from above and below. By heating aforesaid plates or increasing the plates itself, color paper p is heated while being conveyed. On the surface of color paper p sent to heat plates 21, the developing starter and the developing proceeding liquid which were fed at developing starter feeding shower pipe 29 and developing proceeding liquid feeding shower pipe 29 still remain. Therefore, color photographic processing is continuously conducted even during color paper p is conveyed between heat plates 21 by means of conveyance rollers 20.

Color paper p is preferably heated to 50–80° C. by means of heat plates 21, from the viewpoint of processing rapidity.

Color paper p which passed heat plates 21 is sent to bleach-fixing section 410 from color photographic processing section 2 through conveyance rollers 3.

Here, processing step time and processing liquid feeding time will be explained.

The leading end of color paper p touches the developing starter contained in developing starter tank 5 is defined to be a processing step starting point (Point A). The leading end of color paper p comes out of developing proceeding tank 5 is defined to be Point B. The leading end of color paper p touches the developing proceeding liquid contained in developing proceeding tank 6 is defined to be a processing step starting point (Point C). The leading end of color paper p comes out of developing proceeding tank 5 is defined to be Point D. A point where the leading end of color paper p touches the bleach-fixing liquid in bleach-fixing tank 410 wherein bleach-fixing step is conducted is defined to be processing step finishing point (point E).

"Processing step time" in a color photographic processing step of the present embodiment is defined to be time since the leading end of color paper p is conveyed from Point A to Point E ($T_{tot}$).

"Processing liquid feeding time" in the color photographic processing step of the present embodiment is defined to be the sum of the time ($T_{dev}$) between a time since the leading end of color paper p is conveyed to point B, and a time since the leading end of color paper p is conveyed from point C to point D.

$$0 < T_{dev}/T_{tot} \leq 0.7,$$

and preferably $$0 < T_{dev}/T_{tot} \leq 0.3.$$

In the present embodiment, $T_{tot}$ is 10 seconds.

Embodiment 4

Next, another example of the embodiment of an automatic developing machine of the present invention will be explained referring to FIG. 5.

Figure 5:
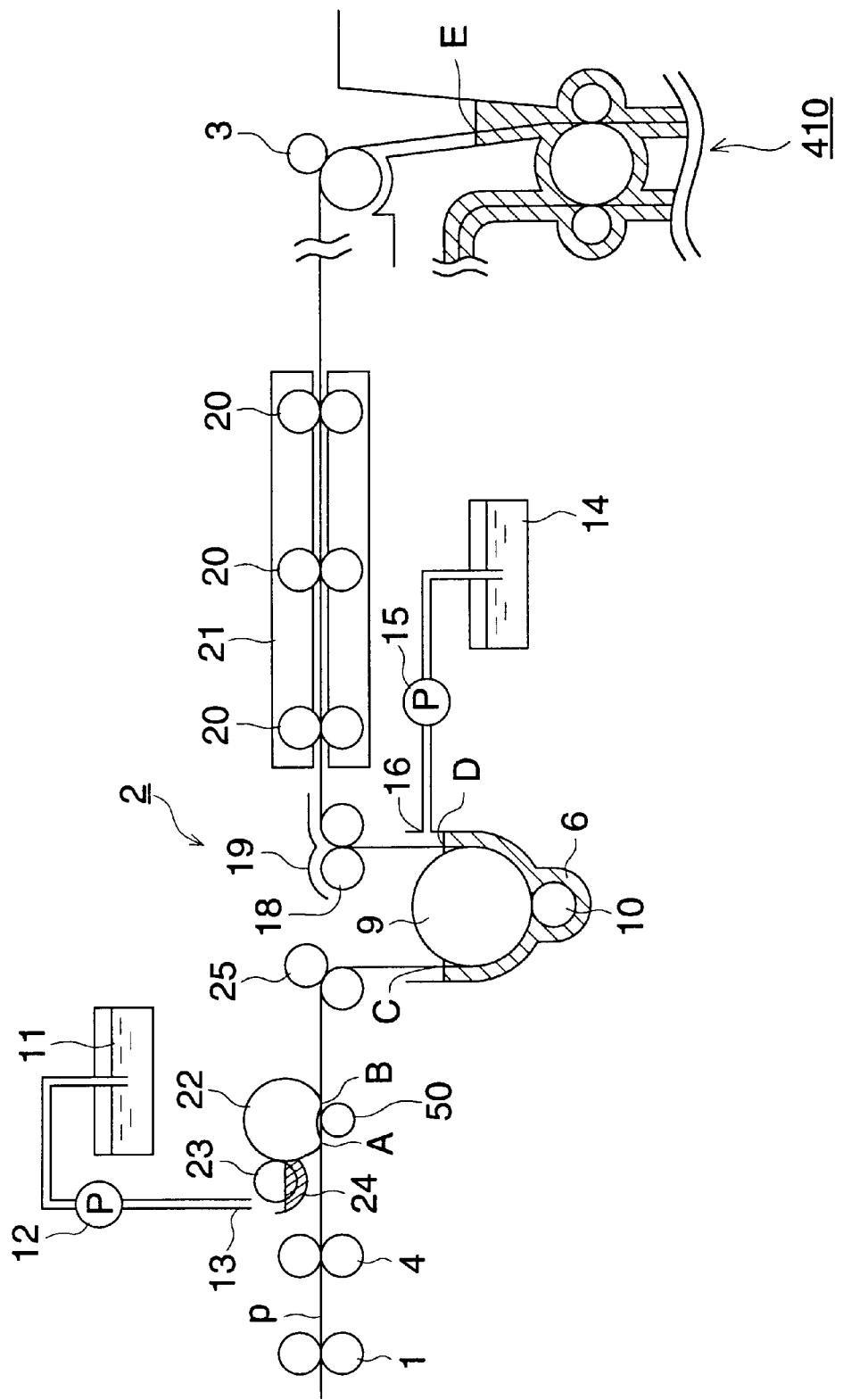
FIG. 5 is a schematic block drawing showing still yet another example of an embodiment of a color developing section of an automatic developing machine for silver halide photographic light-sensitive of the present invention.

FIG. 5 is a schematic drawing showing another examples of the embodiment of color photographic processing section 2 which conducts a color photographic processing step. Incidentally, the present embodiment employs a medium contact type sponge roller and a dip type developing tank as a processing liquid feeding means.

All portions except for color photographic processing section 2 in the automatic developing machine is completely the same as those in Embodiment 1.

Color paper p is fed to color photographic processing section 2 from exposure device 200 through conveyance rollers 1. Color paper p is pressed onto heat rollers 4, which is a heating means. Aforesaid color paper p is conveyed while being heated at 50° C. or more and 80° C. or less, and then, conveyed to developing starter feeding roller 22.

Developing proceeding liquid feeding rollers 22 is adjoiningly provided with feeding rollers 23 and liquid reservoir section 24 wherein the developing proceeding liquid is reserved. The developing starter stored in liquid reservoir 24 is fed to developing proceeding liquid feeding rollers 22 through feeding rollers 23. Developing starter feeding rollers 22 are also sponge rollers. The developing starter fed to developing proceeding liquid feeding rollers 22 by means of feeding rollers 23 is retained to the sponge on the surface of developing proceeding liquid feeding roller 22. The developing starter is a processing liquid containing a color developing agent.

Color paper p conveyed hereto is supplied by means of developing starter feeding rollers 22, while the developing starter is coated onto the surface of the color paper. Color paper p is conveyed from developing proceeding liquid feeding rollers 22 to developing proceeding tank 6 through conveyance rollers 50 and 25.

Renewal of the developing starter is conducted by feeding the developing starter replenishing liquid stored in developing starter replenishing liquid cartridge 11 to liquid reservoir 24 through replenishing port 13.

In developing proceeding tank 6, a processing liquid containing an alkaline agent is contained as a developing proceeding liquid. Color paper p is fed through conveyance rollers 9 and 10, and is dipped in the developing proceeding liquid in developing proceeding tank 6. Color paper p is fed to guide 19 through conveyance roller 18, and also fed to heat plates 21 from developing proceeding tank 6.

With regard to the feeding of the developing proceeding liquid onto developing proceeding tank 6, the developing proceeding replenishing liquid stored in developing proceeding replenishing liquid cartridge 14 is fed to the replenishing port of developing proceeding tank 6 by means of pump 15.

Color paper p conveyed from developing proceeding tank 6 through conveyance roller 18 is conveyed between heat plates by means of conveyance rollers 20. Heat plates are two sheets of plates which sandwiches color paper p from above and below. By heating aforesaid plates or increasing the plates itself, color paper p is heated while being conveyed. On the surface of color paper p sent to heat plates 21, the developing starter and the developing proceeding liquid which were fed at developing starter feeding roller 22 and developing proceeding tank 6 still remain. Therefore, color photographic processing is continuously conducted even during color paper p is conveyed between heat plates 21 by means of conveyance rollers 20.

Color paper p is preferably heated to 50°–80° C. by means of heat plates 21, from the viewpoint of processing rapidity.

Color paper p which passed heat plates 21 is sent to bleach-fixing section 410 from color photographic processing section 2 through conveyance rollers 3.

Incidentally, the developing starter may be fed from a dip type developing tank, so that the developing proceeding liquid may be fed by a sponge roller.

Here, processing step time and processing liquid feeding time will be explained.

The leading end of color paper p touches the developing starter contained in developing starter tank 5 is defined to be a processing step starting point (Point A). The leading end of color paper p comes out of developing proceeding tank 5 is defined to be Point B. The leading end of color paper p touches the developing proceeding liquid contained in developing proceeding tank 6 is defined to be a processing step starting point (Point C). The leading end of color paper p comes out of developing proceeding tank 5 is defined to be Point D. A point where the leading end of color paper p touches the bleach-fixing liquid in bleach-fixing tank 410 wherein bleach-fixing step is conducted is defined to be processing step finishing point (Point E).

"Processing step time" in a color photographic processing step of the present embodiment is defined to be time since the leading end of color paper p is conveyed from point A to point E ($T_{tot}$).

"Processing liquid feeding time" in the color photographic processing step of the present embodiment is defined to be the sum of the time ($T_{dev}$) between a time since the leading end of color paper p is conveyed to point B, and a time since the leading end of color paper p is conveyed from point C to point D.

$$0 < T_{dev}/T_{tot} \leq 0.7,$$

and preferably $$0 < T_{dev}/T_{tot} \leq 0.3.$$

In the present embodiment, $T_{tot}$ is 10 seconds.

Embodiment 5

Figure 6:
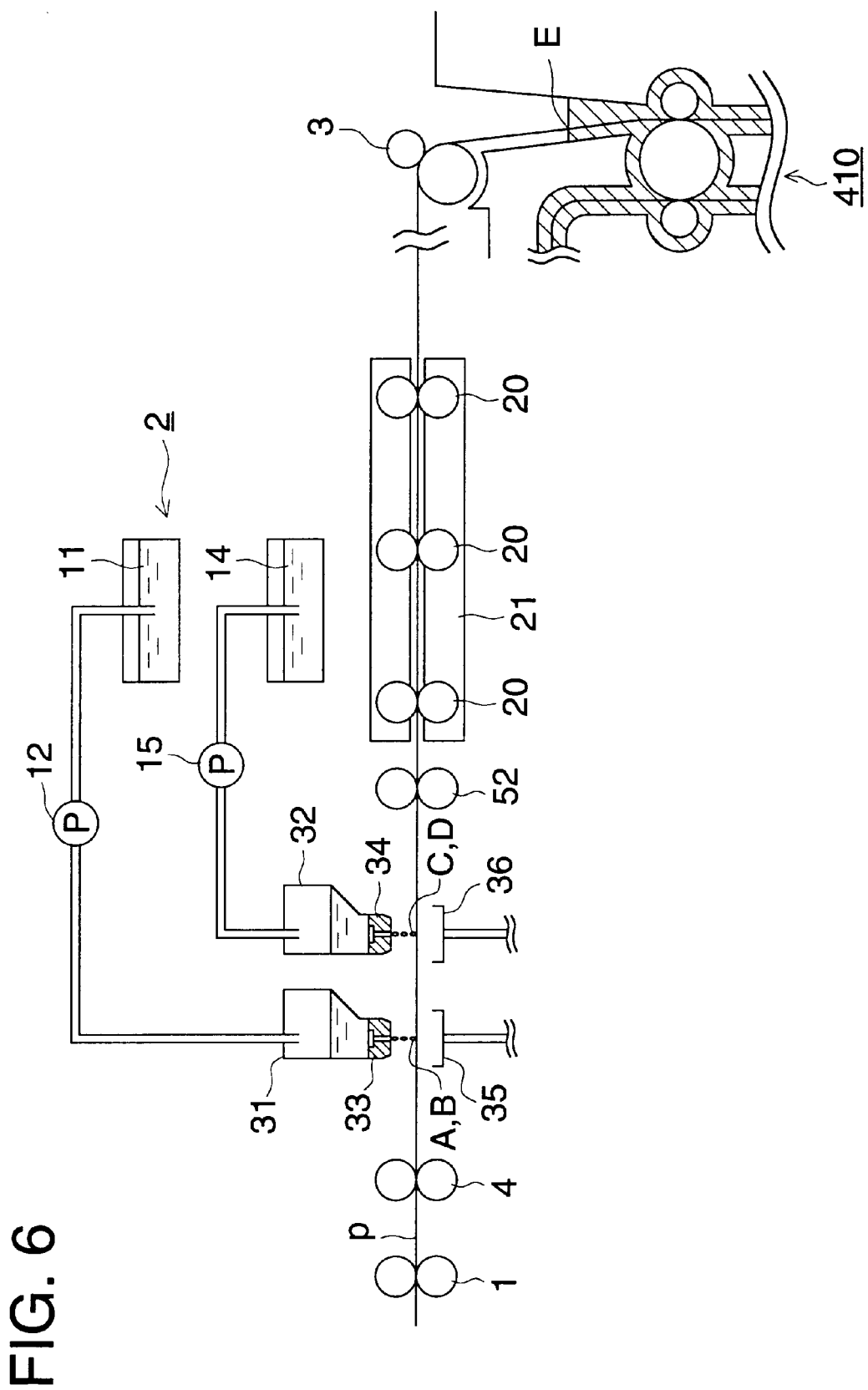
FIG. 6 is a schematic block drawing showing further still yet another example of an embodiment of a color developing section of an automatic developing machine for silver halide photographic light-sensitive of the present invention.

Referring to FIG. 6, another example of an automatic developing machine of the present invention will be explained.

FIG. 6 is a schematic view showing another example of an embodiment of color photographic processing section 2 which conducts a color photographic processing step. The present embodiment feeds the processing liquid to color paper through gas phase by the use of an ink jet head identical to a non-contact type ink jet printer as a processing liquid feeding means.

Both of developing starter feeding ink jet head 31 which feeds the developing starter and developing proceeding feeding ink jet head 31 which feeds the developing proceeding liquid are either a system to spray liquid drop from an orifice which is a processing liquid feeding port by changing the volume of the processing liquid in the chamber by means of an electro-mechanical conversion means such as a piezo-electrical element or a system to spray liquid drop from an orifice by occurring bubbles inside the processing liquid chamber by means of heating elements by enhancing processing liquid pressure.

Both of developing starter feeding ink jet head 31 which feeds the developing starter and developing proceeding feeding ink jet head 31 which feeds the developing proceeding liquid are a system in which the processing liquid is fed while the ink jet head moves in the lateral direction of color paper as in a conventional ink jet head and the processing liquid is fed while color paper moves perpendicular to the movement direction of ink jet head or a system in which the ink jet head has a bar shaped (line-shaped) having the size of color paper, the processing liquid is fed while the ink jet head is fixed not moving and the processing liquid is fed while the color paper is moving perpendicular to the lateral direction of the ink jet head.

Orifices on the ink jet head are arranged in a bar-shaped, surface-shaped and dot-shaped.

In addition, a system in which a color paper is moved while the ink jet head is fixed. Further, a color paper conveyed is temporarily stopped and the processing liquid is fed on a surface-like at once by the use of a surface-shaped ink jet head.

Number of feeding the processing liquid onto color paper in a form of liquid drop is preferably once or more and $1 \times 10^6$ or less, and more preferably 10 times or more and $1 \times 10^5$ or less per second.

The form of orifice which is a feeding port of the processing liquid of the ink jet head may be anything, including rectangular, circular and oval. In order to prevent clogging even when the processing liquid is slightly dried, the area of each orifice is preferably $1 \times 10^{-11}$ m$^2$ or more and more preferably $1 \times 10^{-8}$ m$^2$ or more. In terms of feeding the processing liquid uniformly, it is preferably $1 \times 10^{-6}$ m$^2$ or less and more preferably $1 \times 10^{-8}$ m$^2$ or less. The interval of orifices in terms of the average distance between two fringe of the most adjoining feeding ports is preferably $5 \times 10^{-6}$ more and $1 \times 10^{-3}$ m$^2$ or less in order to feed the processing liquid sufficiently onto color paper.

The distance between the orifice and the color paper emulsion surface is preferably 50 μm or more and 10 mm or less and more preferably 1 mm or more and 5 mm or less.

All portion in the automatic developing machine except for color.

Color paper p is fed to color photographic processing section 2 from exposure device 200 through conveyance rollers 1. Color paper p is pressed onto heat rollers 4, which is a heating means. Aforesaid color paper p is conveyed while being heated at 50° C. or more and 80° C. or less, and then, conveyed to developing starter feeding ink jet head 31.

The developing starter is fed onto the surface of color paper p conveyed through gas phase by means of developing starter feeding ink jet head 31. Color paper p is conveyed to developing proceeding liquid feeding ink jet head 32 from developing starter feeding ink jet head 31.

The developing starter is replenished by feeding the developing starter replenishing liquid stored in developing starter replenishing liquid cartridge 11 to developing starter feeding ink jet head 31 by means of pump 12.

Liquid receiving means 35 is provided facing developing starter feeding ink jet head 31 through the conveyance path of color paper p. Aforesaid liquid receiving means 35 receives the developing starter fed to out of color paper p and the developing starter excessively fed. Even when color paper p is not conveyed, clogging of the orifices on developing starter feeding ink jet head 31 due to drying of the processing liquid may be prevented by spraying the developing liquid periodically onto liquid receiving means 25.

The developing proceeding liquid is fed onto color paper p conveyed from developing starter feeding ink jet head 31 by means of developing proceeding liquid feeding ink jet head 32 for color photographic processing. Color paper p is sent to heat plates 21 from developing proceeding liquid feeding ink jet head 32 through conveyance rollers 52. The developing proceeding liquid is a processing liquid containing an alkaline agent.

With regard to the replenishment of the developing proceeding liquid, the developing proceeding replenishing liquid stored in developing proceeding replenishing liquid cartridge is fed to developing proceeding liquid feeding ink jet head 32 by pump 15.

Liquid receiving means 36 is also provided facing developing starter feeding ink jet head 31 through the conveyance path of color paper p.

Color paper p conveyed from developing proceeding feeding ink jet head 32 through conveyance roller 52 is conveyed between heat plates by means of conveyance rollers 20. Heat plates are two sheets of plates which sandwiches color paper p from up and down. By heating aforesaid plates or increasing the plates itself, color paper p is heated while being conveyed. On the surface of color paper p sent to heat plates 21, the developing starter and the developing proceeding liquid which were fed at developing starter feeding ink jet head 31 and developing proceeding liquid feeding ink jet head 32 still remain. Therefore, color photographic processing is continuously conducted even during color paper p is conveyed between heat plates 21 by means of conveyance rollers 20.

Color paper p is preferably heated to 50°–80° C. by means of heat plates 21, from the viewpoint of processing rapidity.

Color paper p which passed heat plates 21 is sent to bleach-fixing section 410 from color photographic processing section 2 through conveyance rollers 3.

The exposure amount onto color paper p is stored, a signal which converts he exposure amount onto color paper p to the amount of color developing feeding in an image forming apparatus. Together with aforesaid signal, the feeding amount of the processing liquid in developing starter feeding ink jet head 31 and developing proceeding liquid feeding ink jet head 32 may be varied.

Here, processing step time and processing liquid feeding time will be explained.

The leading end of color paper p to which the developing starter is fed by developing starter feeding ink jet 31 is defined to be a processing step starting point (point A). The point where feeding of the developing starter is finished is defined to be Point B. The leading end of color paper p to which the developing proceeding liquid is fed by developing proceeding liquid feeding ink jet 32 is defined to be a processing point (point C). The point where feeding of the developing proceeding liquid is finished is defined to be Point D. A point where the leading end of color paper p touches the bleach-fixing liquid in bleach-fixing tank 410 wherein bleach-fixing step is conducted is defined to be processing step finishing point (point E).

"Processing step time" in a color photographic processing step of the present embodiment is defined to be time since the leading end of color paper p is conveyed from point A to point E ($T_{tot}$).

"Processing liquid feeding time" in the color photographic processing step of the present embodiment is defined to be the sum of the time ($T_{dev}$) between a time since the leading end of color paper p is conveyed to point B, and a time since the leading end of color paper p is conveyed from point C to point D.

$$0 < T_{dev}/T_{tot} \leq 0.7,$$

and preferably $$0 < T_{dev}/T_{tot} \leq 0.3.$$

In the present embodiment, $T_{tot}$ is 10 seconds.

Embodiment 6

Figure 7:
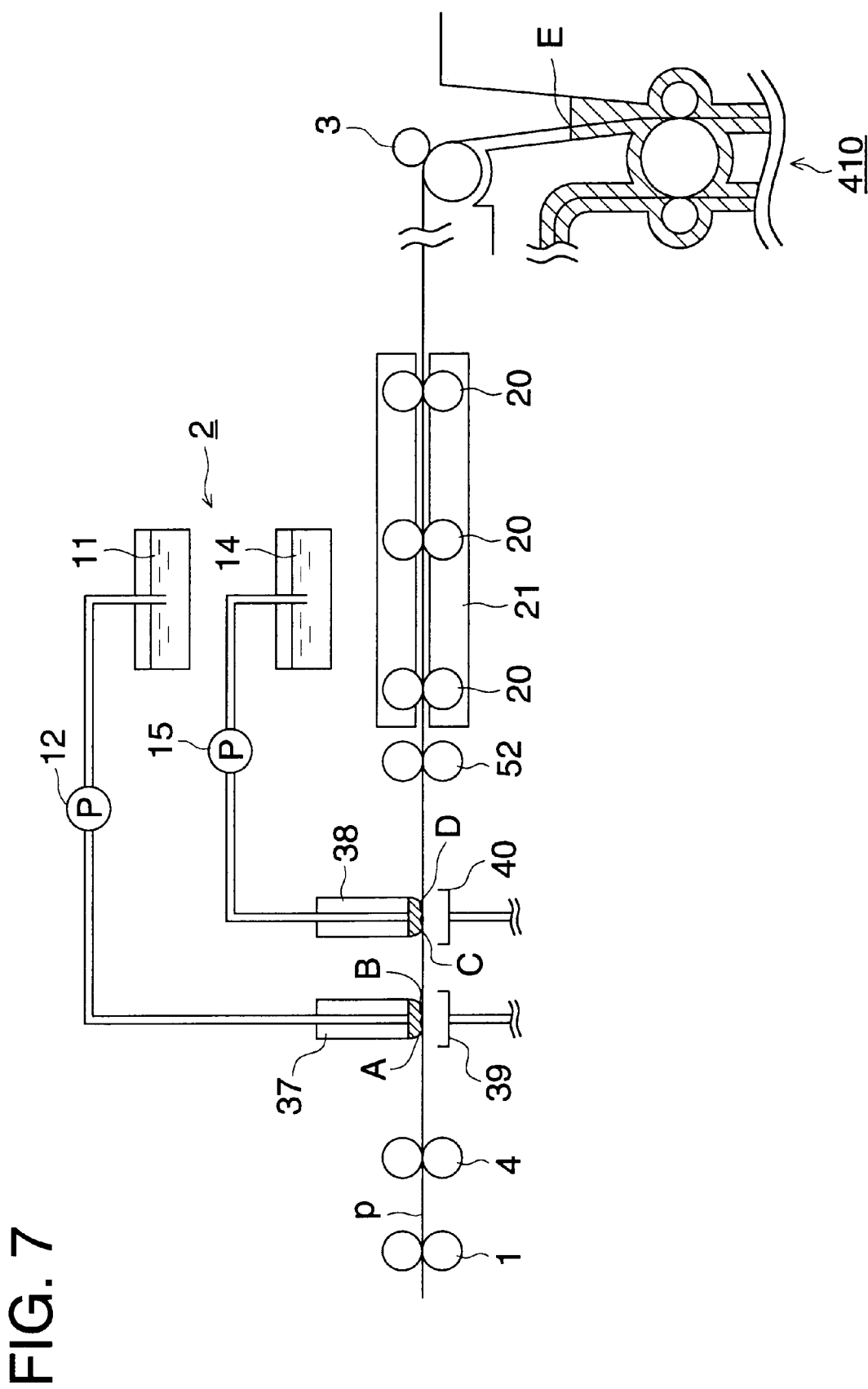
FIG. 7 is a schematic block drawing showing further still yet another example of an embodiment of a color developing section of an automatic developing machine for silver halide photographic light-sensitive of the present invention.

Referring to FIG. 7, another example of an automatic developing machine of the present invention will be explained.

FIG. 7 is a schematic view showing another example of an embodiment of color photographic processing section 2 which conducts a color photographic processing step. The present embodiment feeds the processing liquid to color paper by the use of two contact type coating devices as a processing liquid feeding means.

All portions in the automatic developing machine except for color photographic processing section 2 is identical to that of Embodiment 1.

Color paper p is fed to color photographic processing section 2 from exposure device 200 through conveyance rollers 1. Color paper p is pressed onto heat rollers 4, which is a heating means. Aforesaid color paper p is conveyed while being heated at 50° C. or more and 80° C. or less, and then, conveyed to developing starter coating device 37.

The leading edge of developing starter coating device 37 is made of a material which can retain plastic liquid such as a sponge or a felt material. When the developing starter is fed onto aforesaid leading edge, aforesaid leading edge retains the developing starter. By touching the edge portion onto color paper p conveyed so that the developing starter retained therein is coated so that the developing starter is fed onto the emulsion surface of color paper p.

The developing starter is fed onto color paper p conveyed by developing starter coating device 37. Aforesaid color paper p is conveyed to developing proceeding liquid coating device 38.

The developing starter is replenished by feeding the developing starter replenishing liquid stored in developing starter replenishing liquid cartridge 11 to developing starter coating device 37 by means of pump 12.

If pumps 12 and 15 are not operated, the processing liquid is retained a the leading end due to the surface tension of the processing liquid, and the processing liquid is not leaked.

Liquid receiving means 39 is provided facing developing starter coating device 37 through the conveyance path of color paper p. Aforesaid liquid receiving means 39 receives the developing starter fed to out of color paper p and the developing starter excessively fed. Even when color paper p is not conveyed, clogging of the orifices on developing starter feeding ink jet head 31 due to drying of the processing liquid may be prevented by spraying the developing liquid periodically onto liquid receiving means 39.

The developing proceeding liquid is fed onto color paper p conveyed from developing starter coating device 37 by means of developing proceeding liquid coating device 38 for color photographic processing. Color paper p is sent to heat plates 21 from developing proceeding liquid feeding ink jet head 32 through conveyance rollers 52. The developing proceeding liquid is a processing liquid containing an alkaline agent.

The developing starter is replenished by feeding the developing starter replenishing liquid stored in developing starter replenishing liquid cartridge 14 to developing starter coating device 38 by means of pump 15.

Liquid receiving means 40 is also provided facing developing proceeding coating device 38 through the conveyance path of color paper p.

Color paper p conveyed from developing proceeding liquid coating device 38 through conveyance roller 52 is conveyed between heat plates 21 by means of conveyance rollers 20. Heat plates 21 are two sheets of plates which sandwiches color paper p from above and below. By heating aforesaid plates or increasing the plates itself, color paper p is heated while being conveyed. On the surface of color paper p sent to heat plates 21, the developing starter and the developing proceeding liquid which were fed at developing starter coating device 37 and developing proceeding coating device 38 still remain. Therefore, color photographic processing is continuously conducted even during color paper p is conveyed between heat plates 21 by means of conveyance rollers 20.

Color paper p is preferably heated to 50°–80° C. by means of heat plates 21, from the viewpoint of processing rapidity.

Color paper p which passed heat plates 21 is sent to bleach-fixing section 410 from color photographic processing section 2 through conveyance rollers 3.

Here, processing step time and processing liquid feeding time will be explained.

The leading end of color paper p which touches the developing starter coating device 37 is defined to be a processing step starting point (Point A). The leading end of color paper p leaves developing proceeding coating device 37 is defined to be Point B. The leading end of color paper p which touches the developing proceeding coating device 38 is defined to be point C. The point where the leading end of color paper p leaves developing proceeding coating device is defined to be Point D. A point where the leading end of color paper p touches the bleach-fixing liquid in bleach-fixing tank 410 wherein bleach-fixing step is conducted is defined to be processing step finishing point (point E).

"Processing step time" in a color photographic processing step of the present embodiment is defined to be time since the leading end of color paper p is conveyed from point A to point E ($T_{tot}$).

"Processing liquid feeding time" in the color photographic processing step of the present embodiment is defined to be the sum of the time ($T_{dev}$) between a time since the leading end of color paper p is conveyed to point B, and a time since the leading end of color paper p is conveyed from point C to point D.

$$0 < T_{dev}/T_{tot} \leq 0.7,$$

and preferably $$0 \leq T_{dev}/T_{tot} \leq 0.3.$$

In the present embodiment, $T_{tot}$ is 10 seconds.

Embodiment 7

Figure 8:
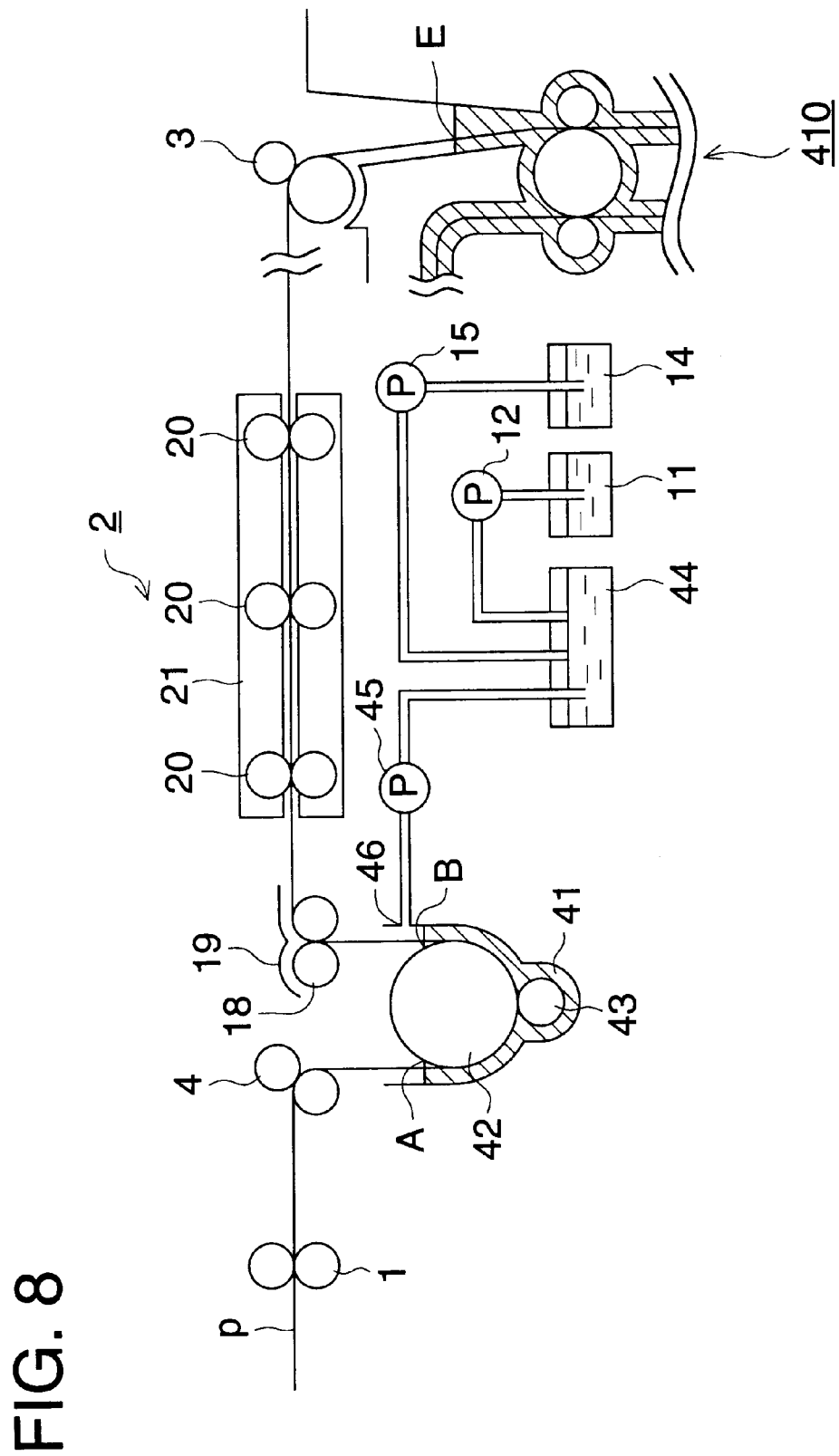
FIG. 8 is a schematic block drawing showing still yet another example of an embodiment of a color developing section of an automatic developing machine for silver halide photographic light-sensitive of the present invention.

Referring to FIG. 8, another example of an automatic developing machine of the present invention will be explained.

FIG. 8 is a schematic view showing another example of an embodiment of color photographic processing section 2 which conducts a color photographic processing step. The present embodiment feeds the processing liquid to color paper through gas phase by the use of an ink jet head identical to a non-contact type ink jet printer as a processing liquid feeding means.

All portion in the automatic developing machine except for color.

Color paper p is fed to color photographic processing section 2 from exposure device 200 through conveyance rollers 1. Color paper p is pressed onto heat rollers 4, which is a heating means. Aforesaid color paper p is conveyed while being heated at 50° C. or more and 80° C. or less, and then, conveyed to developing starter feeding ink jet head 31.

In developing tank 41, a developing starter which is a processing liquid containing a color developing agent and a developing liquid in which a developing proceeding liquid which is a processing liquid containing an alkaline agent. The developing starter replenishing liquid stored in developing starter replenishing liquid cartridge 11 is fed to mixing tank 44 by means of pump 12. By feeding the developing proceeding replenishing liquid stored in developing proceeding replenishing liquid cartridge 13 to mixing tank 44 by pump 14, the developing starter and the developing liquid proceeding liquid are mixed for preparing a developing liquid. The developing liquid in mixing tank 44 is fed to developing tank 41 from replenishing port 46 by means of pump 45.

Color paper p is conveyed by conveyance rollers 42 and 43. In developing tank 41, color paper p is dipped in the developing liquid, and is sent to heat plates 21 from developing tank 41 via guide 19 through conveyance rollers 18.

Color paper p conveyed from developing proceeding tank 41 through conveyance roller 18 is conveyed between heat plates by means of conveyance rollers 20. Heat plates 21 are two sheets of plates which sandwiches color paper p from up and down. By heating aforesaid plates 21 or increasing the plates itself, color paper p is heated while being conveyed. On the surface of color paper p sent to heat plates 21, the developing liquid which was dipped in developing tank 41 still remain. Therefore, color photographic processing is continuously conducted even during color paper p is conveyed between heat plates 21 by means of conveyance rollers 20.

Color paper p is preferably heated to 50–80° C. by means of heat plates 21, from the viewpoint of processing rapidity.

Color paper p which passed heat plates 21 is sent to bleach-fixing section 410 from color photographic processing section 2 through conveyance rollers 3.

Here, processing step time and processing liquid feeding time will be explained.

The leading end of color paper p touches the developing starter contained in developing starter tank 41 is defined to be a processing step starting point (point A). The leading end of color paper p comes out of developing proceeding tank 41 is defined to be Point B. A point where the leading end of color paper p touches the bleach-fixing liquid in bleach-fixing tank 410 wherein bleach-fixing step is conducted is defined to be processing step finishing point (point E).

"Processing step time" in a color photographic processing step of the present embodiment is defined to be time since the leading end of color paper p is conveyed from point A to point E ($T_{tot}$).

"Processing liquid feeding time" in the color photographic processing step of the present embodiment is defined to be the sum of the time ($T_{dev}$) between a time since the leading end of color paper p is conveyed to point B, and a time since the leading end of color paper p is conveyed from point C to point D.

$$0 < T_{dev}/T_{tot} \leq 0.7,$$

and preferably $$0 < T_{dev}/T_{tot} \leq 0.3.$$

In the present embodiment, $T_{tot}$ is 10 seconds.

EXAMPLES

Experiment Result 1

In embodiment 1, an experiment was conducted while $T_{tot}$, was kept constant and $T_{dev}$ was varied. Their conditions and experiment results are as follows:

| [Formula of a processing liquid (per 1 liter)] <Developing starter> | |
|---|---|
| Water | 700 ml |
| Sodium sulfite | 0.4 g |
| Pentasodium diethylenetriamine pentaacetic acid | 3.0 g |
| p-toluene sulfonic acid | 20.0 g |
| 4-amino-3-methyl-N-ethyl-N-(β-(methanesulfonamide)ethyl aniline sulfate (CD-3) | 40.0 g |

Water was added to make 1 liter.
ph was regulated to 2.0 using potassium hydroxide or sulfuric acid.

| <Developing proceeding liquid> | |
|---|---|
| Water | 600 ml |
| Pentasodium diethylenetriamine pentaacetic acid | 3.0 g |
| Potassium carbonate | 80.0 g |
| p-toluene sulfonic acid | 20.0 g |

Water was added to make 1 liter.
ph was regulated to 13.0 using potassium hydroxide or sulfuric acid.

The bleach-fixing processing and the stabilizing step were conducted using CPK-2-JI processing conditions and processing chemicals for the same.

By changing the diameter of conveyance rollers 7 and 9 in FIG. 2, and by changing the liquid amount of the first developing tank and the second developing tank, $T_{dev}$ was changed for experiment. Incidentally, $T_{tot}$ was 10 seconds.

By means of heat rollers, color paper was heated to 60° C. for processing.

Processing amount per day was 1 m² of color paper having 30 cm width. Amount of liquid fed was 25 ml per 1 m² of color paper (both of the developing starter and the developing proceeding liquid).

After processing for 20 days, control stripes of color paper QA-A6 produced by Konica was processed for measuring the maximum density Dmax of blue (B).

Whether or not there is coagulation on the liquid interface in the first developing tank and in the second developing tank.

Table 1 shows the results thereof.

TABLE 1

| | $T_{dev}/T_{tot} \times$ 100 (%) | $D_{max}$ (B) | Coagulation | Liquid amount in the developing tank (l) | Renewal rate (%) |
|---|---|---|---|---|---|
| 1 | 5 | 2.23 | no | 0.1 | 5.0 |
| 2 | 10 | 2.23 | no | 0.2 | 2.5 |
| 3 | 30 | 2.20 | no | 1.1 | 0.43 |
| 4 | 70 | 2.10 | no | 1.5 | 0.33 |
| 5 | 90 | 1.65 | yes | 1.75 | 0.29 |

From the above-mentioned results, it can be understood that the automatic developing machines of the present invention has high photographic processing stability and excellent maintenance property wherein there is no coagulation in the liquid interface, since the renewal rate of the processing liquid is high.

Experiment Result 2

In embodiment 2, an experiment was conducted. Their conditions and experiment results are as follows:

Formula of processing liquid is the same as those of Experiment results 1.

The bleach-fixing processing and the stabilizing step were conducted using CPK-2-JI processing conditions and processing chemicals for the same.

Processing amount per day was 1 m² of color paper having 30 cm width. Amount of liquid fed was 25 ml per 1 m² of color paper (both of the developing starter and the developing proceeding liquid). Incidentally, $T_{tot}$ was 10 seconds and $T_{dev}$ was 1 second. Therefore, $T_{dev}/T_{tot}=0.1$.

By means of heat rollers, color paper was heated to 60° C. for processing.

After processing for 20 days, control stripes of color paper QA-A6 produced by Konica was processed for measuring the maximum density Dmax of blue (B).

From the above-mentioned results, it can be understood that the automatic developing machines of the present invention provides Dmax (B) of 2.25 and therefor has high photographic processing stability and excellent maintenance property wherein there is no coagulation in the liquid reservoir portion.

Experiment Result 3

In embodiment 1, an experiment was conducted while temperature of color paper was varied by means of a heat roller. Their conditions and experiment results are as follows:

Formula of processing liquid is the same as those of Experiment results 1.

The bleach-fixing processing and the stabilizing step were conducted using CPK-2-JI processing conditions and processing chemicals for the same.

Processing amount per day was 1 m² of color paper having 30 cm width. Amount of liquid fed was 25 ml per 1 m² of color paper (both of the developing starter and the developing proceeding liquid).

Liquid amount in the developing tank was 1.1 liter.

After processing, maximum density Dmax of blue (B) was measured.

Incidentally, $T_{tot}$ was 10 seconds and $T_{dev}$ was 1 second. Therefore, $T_{dev}/T_{tot}=0.1$.

Table 2 shows the results thereof.

TABLE 2

| | Temperature of heat rollers (° C.) | $D_{max}$ (B) |
|---|---|---|
| 1 | 30 | 1.58 |
| 2 | 50 | 2.20 |
| 3 | 60 | 2.23 |

From the above-mentioned results, it can be understood that the automatic developing machines of the present invention has high photographic processing stability while capable of rapid processing.

Experiment Result 4

In embodiment 1, an experiment was conducted while temperature of color paper was varied by means of a heat roller. Their conditions and experiment results are as follows:

Formula of processing liquid is the same as those of Experiment results 1.

The bleach-fixing processing and the stabilizing step were conducted using CPK-2-JI processing conditions and processing chemicals for the same.

Processing amount per day was 1 m² of color paper having 30 cm width. Amount of liquid fed was 25 ml per 1 m² of color paper (both of the developing starter and the developing proceeding liquid).

After processing, maximum density Dmax of blue (B) was measured.

Incidentally, $T_{tot}$ was 10 seconds and $T_{dev}$ was 1 second. Therefore, $T_{dev}/T_{tot}=0.1$.

Table 2 shows the results thereof.

TABLE 3

| | Temperature of heat rollers (° C.) | $D_{max}$ (B) |
|---|---|---|
| 1 | 30 | 1.60 |
| 2 | 50 | 2.23 |
| 3 | 60 | 2.25 |
| 4 | 80 | 2.25 |
| 5 | 100 | The emulsion surface lost transparency so that measurement was impossible |

From the above-mentioned results, it can be understood that the automatic developing machines of the present invention has high photographic processing stability while capable of rapid processing.

Experiment Result 5

Embodiment 1 wherein there are two developing tanks and the developing starter and the developing proceeding liquid are separately fed to color paper and Embodiment 8 wherein the developing starter and the developing proceeding liquid are fixed and then fed to color paper. Their conditions and experiment results are as follows:

Formula of processing liquid is the same as those of Experiment results 1.

The bleach-fixing processing and the stabilizing step were conducted using CPK-2-JI processing conditions and processing chemicals for the same.

Incidentally, $T_{dev}/T_{tot}=0.1$, wherein $T_{dev}$ and $T_{tot}$ were respectively varied for experiment.

Processing amount per day was 1 m² of color paper having 30 cm width. Amount of liquid fed was 25 ml per 1 m² of color paper (both of the developing starter and the developing proceeding liquid).

By means of heat rollers, color paper was heated to 60° C. for processing.

Liquid amount in the developing tank was 1.1 liter for both of one-tank type and two-tank type.

After processing for 20 days, control stripes of color paper QA-A6 produced by Konica Corporation was processed so that maximum density Dmax of blue (B) was measured.

Table 4 shows the results thereof.

TABLE 4

| | Number of developing tank | $T_{dev}$ (S) | $T_{tot}$ (S) | $D_{max}$ (B) |
|---|---|---|---|---|
| 1 | Tank 2 | 22 | 220 | 2.25 |
| 2 | Tank 2 | 20 | 200 | 2.23 |
| 3 | Tank 2 | 10 | 100 | 2.23 |
| 4 | Tank 1 | 22 | 220 | 2.24 |
| 5 | Tank 1 | 20 | 200 | 2.21 |
| 6 | Tank 1 | 10 | 100 | 2.01 |

From the above-mentioned results, it can be understood that, in both of Embodiments 1 and 8, an automatic developing machine of the present invention has higher rapidity and photographic processing stability. Those having two developing tanks has slightly higher photographic processing stability compared with those having one developing tank.

Owing to the present invention, an automatic developing machine for silver halide photographic light-sensitive material having high processing stability and excellent maintenance property, while not damaging processing rapidity even when the amount of processing is small and the amount of replenishing of processing liquid is small.

What is claimed is:

1. An apparatus for processing a silver halide photographic light-sensitive material, the apparatus having plural processes of at least a developing process, a bleaching process and a fixing process, comprising supplying means for supplying a processing solution to a silver halide photographic light-sensitive material in at least one process of the plural processes, whereby a point of the silver halide photographic light-sensitive material is supplied with the processing solution during a supplying time, wherein the point of the silver halide photographic light-sensitive material is processed during a processing time in the process and the supplying time is not longer than 70% of the processing time; and heating means for heating the silver halide photographic light-sensitive materialize in such a manner that a surface temperature of the silver halide photographic light-sensitive material when the silver halide photographic light-sensitive material is supplied with the processing solution by the supplying means is 40° C. to 90° C., wherein a length of the silver halide photographic light-sensitive material in a direction perpendicular to the conveying direction is D (cm), the conveying speed in the process is R (cm/sec.), and a volume of the processing solution in a processing tank is 0.3×D×R (ml) to 50×D×R (ml).

2. The apparatus of claim 1, wherein the supplying time is not longer than 30% of the processing time.

3. The apparatus of claim 1, wherein the process is at least one of a color development process and a development process.

4. The apparatus of claim 1, wherein the process is a process in which the supplying means supplies at least two kinds of processing solutions to the silver halide photographic light-sensitive material.

5. The apparatus of claim 4, wherein the two kinds of processing solutions are a processing solution containing a color developing agent and a processing solution containing an alkaline agent.

6. The apparatus of claim 1, wherein the supplying means supplies the processing solution in an amount of 5 ml to 100 ml per 1 m² of the silver halide photographic light-sensitive material during the supplying time.

7. The apparatus of claim 1, wherein the processing time is not longer than 20 seconds.

8. The apparatus of claim 1 wherein the supplying means is above the silver halide photographic light-sensitive material and brings the processing solution in contact with the silver halide photographic light-sensitive material, thereby supplying the processing solution to the silver halide photographic light-sensitive material.

9. An apparatus for processing a silver halide photographic light-sensitive material, the apparatus having plural processes of at least a developing process, a bleaching process and a fixing process comprising:

supplying means for supplying a processing solution to a silver halide photographic light-sensitive material in at least one process of the plural processes, whereby a point of the silver halide photographic light-sensitive material is supplied with the processing solution during a supplying time, wherein the point of the silver halide photographic light-sensitive material is processed during a processing time in the process and the supplying time is not longer than 70% of the processing time, and heating means for heating the silver halide photographic light-sensitive materialize in such a manner that a surface temperature of the silver halide photographic light-sensitive material when the silver halide photographic light-sensitive material is supplied with the processing solution by the supplying means is 40° C. to 90° C., wherein a time during which the silver halide photographic light-sensitive material is contacted by the developing solution is not longer than 5 seconds.

10. The apparatus of claim 9, wherein the supplying means supplies the processing solution through a gas phase to the silver halide photographic light-sensitive material.

11. An apparatus for processing a silver halide photographic light-sensitive material, the apparatus having plural processes of at least a developing process, a bleaching process and a fixing process comprising:

supplying means for supplying a processing solution to a silver halide photographic light-sensitive material in at least one process of the plural processes, whereby a point of the silver halide photographic light-sensitive material is supplied with the processing solution during a supplying time, wherein the point of the silver halide photographic light-sensitive material is processed during a processing time in the process and the supplying time is not longer than 70% of the processing time, and heating means for heating the silver halide photographic light-sensitive materialize in such a manner that a surface temperature of the silver halide photographic light-sensitive material when the silver halide photographic light-sensitive material is supplied with the processing solution by the supplying means is 40° C. to 90° C., wherein the supplying means comprises a supplying medium which is brought into contact with the processing solution so as to retain the processing solution, and the silver halide photographic light-sensitive material is brought into contact with the supplying medium so as to be supplied with the processing solution.

12. The apparatus of claim 11 wherein the supplying medium is a roller which is rotated so as to supply the processing solution to the silver halide photographic light-sensitive material.

13. An apparatus for processing a silver halide photographic light-sensitive material, the apparatus having plural processes of at least a developing process, a bleaching process and a fixing process comprising:

supplying means for supplying a processing solution to a silver halide photographic light-sensitive material in at least one process of the plural processes, whereby a point of the silver halide photographic light-sensitive material is supplied with the processing solution during a supplying time, wherein the point of the silver halide photographic light-sensitive material is processed during a processing time in the process and the supplying time is not longer than 70% of the processing time, and heating means for heating the silver halide photographic light-sensitive materialize in such a manner that a surface temperature of the silver halide photographic light-sensitive material when the silver halide photographic light-sensitive material is supplied with the processing solution by the supplying means is 40° C. to 90° C., and a conveyor for conveying the silver halide photographic light-sensitive material in the process at a conveying speed of 5 mm/second to 500 mm/second, wherein a length of the silver halide photographic light-sensitive material in a direction perpendicular to the conveying direction is D (cm) and the conveying speed in the process is R (cm/sec.), and wherein a capacity of a processing tank is from 0.3×D×R (ml) to 50×D×R (ml).

* * * * *